(12) United States Patent
Kim et al.

(10) Patent No.: US 12,556,967 B2
(45) Date of Patent: Feb. 17, 2026

(54) METHOD AND APPARATUS FOR RECEIVING BSR INFORMATION IN MULTI-LINK OPERATION OF WIRELESS LAN SYSTEM

(71) Applicant: LG ELECTRONICS INC., Seoul (KR)

(72) Inventors: Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 18/256,330

(22) PCT Filed: Jun. 7, 2021

(86) PCT No.: PCT/KR2021/007062
§ 371 (c)(1),
(2) Date: Jun. 7, 2023

(87) PCT Pub. No.: WO2022/145596
PCT Pub. Date: Jul. 7, 2022

(65) Prior Publication Data
US 2024/0049045 A1  Feb. 8, 2024

(30) Foreign Application Priority Data
Dec. 28, 2020 (KR) .......... 10-2020-0185173
Jan. 26, 2021 (KR) .......... 10-2021-0010679
Apr. 2, 2021 (KR) .......... 10-2021-0043464

(51) Int. Cl.
*H04W 28/02* (2009.01)
*H04W 52/02* (2009.01)
(Continued)

(52) U.S. Cl.
CPC ... *H04W 28/0278* (2013.01); *H04W 28/0268* (2013.01); *H04W 52/0206* (2013.01); *H04W 76/15* (2018.02); *H04W 84/12* (2013.01)

(58) Field of Classification Search
CPC ............ H04W 28/0278; H04W 76/15; H04W 28/0268
See application file for complete search history.

(56) References Cited

U.S. PATENT DOCUMENTS

2019/0246312 A1  8/2019  Kim et al.
2021/0144787 A1*  5/2021  Kwon ............... H04W 72/23

OTHER PUBLICATIONS

PCT International Application No. PCT/KR2021/007062, International Search Report dated Sep. 17, 2021, 3 pages.
(Continued)

*Primary Examiner* — Siming Liu
(74) *Attorney, Agent, or Firm* — LEE, HONG, DEGERMAN, KANG & WAIMEY

(57) ABSTRACT

A method and an apparatus for receiving BSR information in a wireless LAN system are presented. Particularly, a reception MLD receives a DL frame from a transmission MLD. The reception MLD transmits a UL frame to the transmission MLD. The DL frame includes BSR information about the reception MLD. The BSR information about the reception MLD is included in a buffer state sub-field of a QoS control field. The BSR information about the reception MLD is traffic information about the reception MLD, which is buffered in the transmission MLD.

11 Claims, 48 Drawing Sheets

(51) Int. Cl.
*H04W 76/15* (2018.01)
*H04W 84/12* (2009.01)

(56) References Cited

OTHER PUBLICATIONS

Kwon et al., "TIM Follow-up," IEEE 802.11-20/0899r3, Oct. 2020, 15 pages.
Liu et al., "BSR Fast Report in BA Frame," IEEE 802.11-20/1686-01-00be, Oct. 2020, 16 pages.
Asterjadhi et al., "Comment resolutions for BSR operation," IEEE 802.11-19/0316r1, Mar. 2019, 6 pages.
Park et al., "Multi-link TIM—follow up," IEEE 802.11-20/0084r1, Apr. 2020, 11 pages.

* cited by examiner (a)

(b)

PPDU Format (IEEE 802.11a/g)

HT PPDU Format (IEEE 802.11n)

VHT PPDU Format (IEEE 802.11ac)

FIG. 10

| L-STF | L-LTF | L-SIG | RL-SIG | U-SIG | EHT-SIG | EHT-STF | EHT-LTF | Data |

FIG. 38

| Variant | B0 | B0 | B2-B29 | B30 | B31 |
|---|---|---|---|---|---|
| HT | 0 | | HT Control Middle | AC Constraint | RDG/More PPDU |
| VHT | 1 | 0 | VHT Control Middle | AC Constraint | RDG/More PPDU |
| HE | 1 | 1 | A-Control | | |

FIG. 41

| Control ID (NMB) | Queue Size All |
|---|---|

FIG. 42

| Control ID (NMB) | Scaling Factor | Queue Size All |
|---|---|---|

FIG. 43

| Control ID (NMB) | ACI Bitmap | Delta TID | ACI High | Scaling Factor | Queue Size High | Queue Size All |

FIG. 45

| B0 | B1 | B2    B3 | B4    B7 |
|---|---|---|---|
| Reserved | Buffer State Indicated | Highest Priority Buffered AC | QoS AP Buffered Load |
| 1 | 1 | 2 | 4 |

Bits:

FIG. 46

| B0 | B1 | B2　　　　B3 | B4　　　　　　B7 |
|---|---|---|---|
| Non-AP MLD PS Buffer State Indicated | Buffer State Indicated | Highest Priority Buffered AC | QoS AP Buffered Load |

Bits:　　1　　　　　　1　　　　　　2　　　　　　　　4

METHOD AND APPARATUS FOR RECEIVING BSR INFORMATION IN MULTI-LINK OPERATION OF WIRELESS LAN SYSTEM

CROSS-REFERENCE TO RELATED APPLICATIONS

This application is the National Stage filing under 35 U.S.C. 371 of International Application No. PCT/KR2021/007062, filed on Jun. 7, 2021, which claims the benefit of earlier filing date and right of priority to Korean Application Nos. 10-2020-0185173, filed on Dec. 28, 2020, 10-2021-0010679, filed on Jan. 26, 2021, and 10-2021-0043464, filed on Apr. 2, 2021, the contents of which are all hereby incorporated by reference herein in their entireties.

TECHNICAL FIELD

The present specification relates a multi-link operation in a wireless local area network (WLAN) system and, most particularly, to a method and apparatus for receiving BSR information for a receiving MLD.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for receiving BSR information in a multi-link operation of a WLAN system.

An example of this specification proposes a method for BSR information in multi-link operation.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment may be performed in the receiving MLD.

This embodiment proposes a method and apparatus for setting a format of buffer status information transmitted from a transmitting MLD (or AP MLD) to a receiving MLD (or non-AP MLD).

A receiving multi-link device (MLD) receives a downlink (DL) frame from a transmitting MLD.

The receiving MLD transmits a UL frame to the transmitting MLD.

The DL frame includes BSR information for the receiving MLD. The BSR information for the receiving MLD is traffic information for the receiving MLD buffered in the transmitting MLD.

BSR information for the receiving MLD is included in a buffer state subfield of a quality of service (QoS) control field. The buffer state subfield is an AP PS Buffer State subfield and is allocated to Bits 8 to 15 of the QoS Control field. That is, this embodiment proposes a method in which the transmitting MLD informs the buffer status of the receiving MLD by using the AP PS Buffer State subfield.

According to the embodiment proposed in this specification, the buffer status for the non-AP MLD can be informed based on the previously defined QoS AP PS Buffer State subfield, and there is an effect that the complexity of implementing the design of the buffer state information transmitted from the transmitting MLD (or AP MLD) to the receiving MLD (or non-AP MLD) can be reduced. In addition, when notifying the buffer status for the non-AP MLD, it is possible to set a threshold value without notifying the queue size itself and inform whether the threshold value is exceeded, thereby reducing the overhead of the beacon frame.

BRIEF DESCRIPTION OF THE DRAWINGS

FIG. 10 illustrates an example of a PPDU used in the present specification.

FIG. 38 shows an example of the HT Control field.

FIG. 41 shows an example of a Non-AP BSR (NMB) Control subfield.

FIG. 42 shows an example of a format in which a scaling factor is added in the subfield of FIG. 41.

FIG. 43 shows an example of the NMB Control Subfield including all of the above information.

FIG. 45 shows an example of an AP PS Buffer State subfield.

FIG. 46 shows an example of an AP PS Buffer State subfield including BSR information for Non-AP MLD.

DETAILED DESCRIPTION

Figure 1:
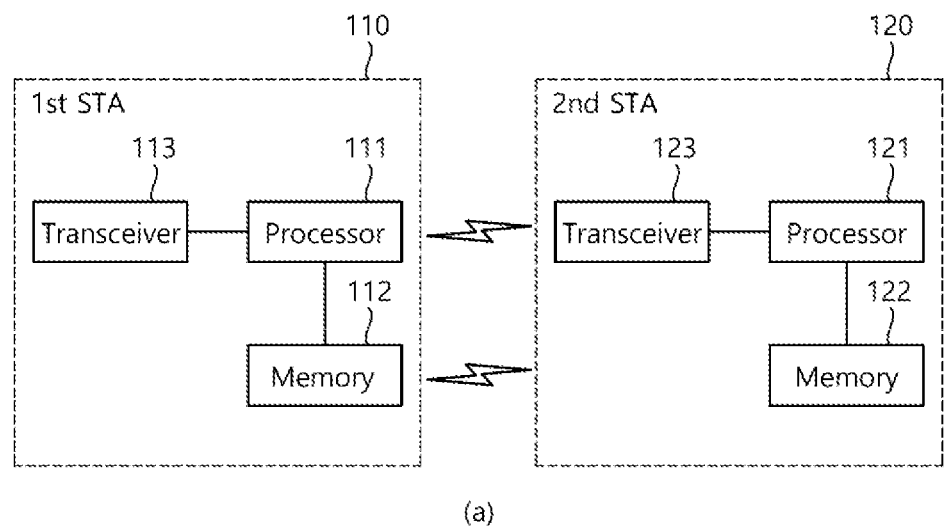
FIG. 1 shows an example of a transmitting apparatus and/or receiving apparatus of the present specification.
Figure 1:
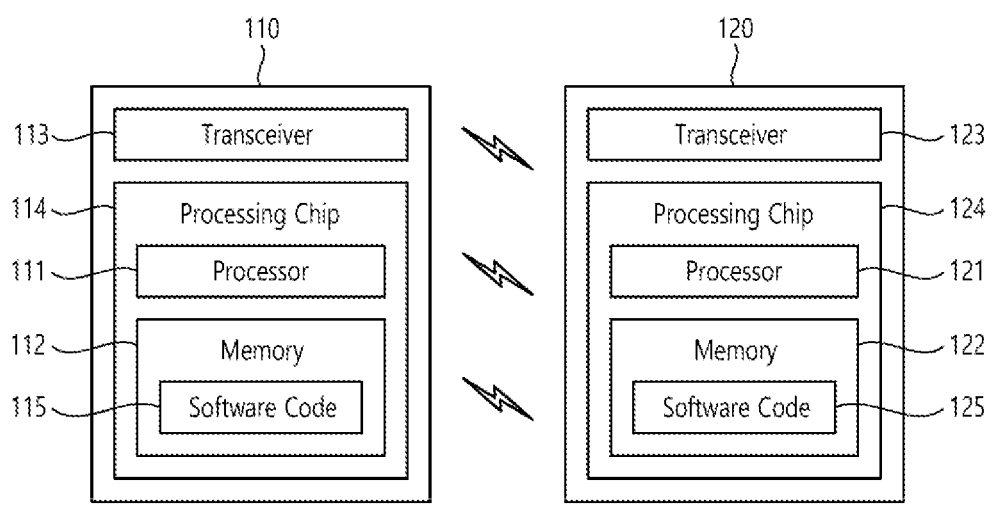

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
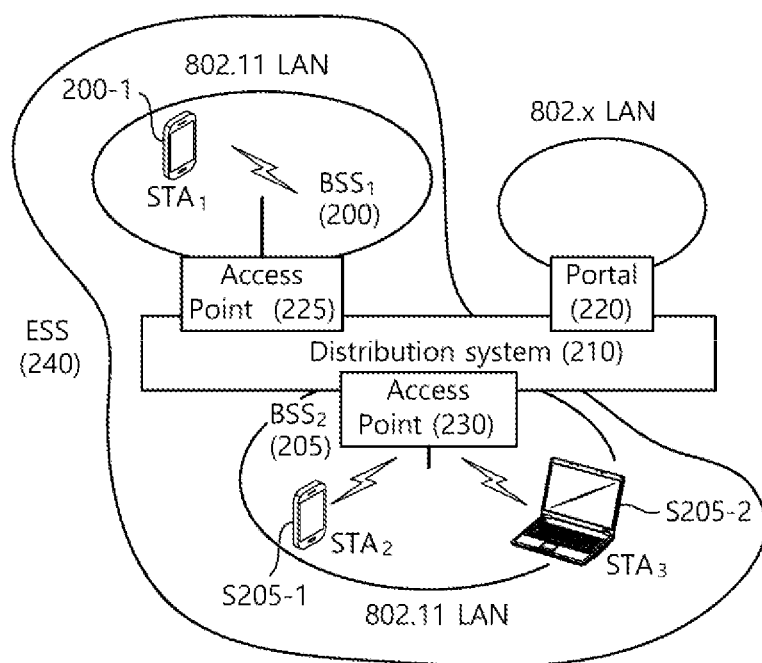
FIG. 2 is a conceptual view illustrating the structure of a wireless local area network (WLAN).
Figure 2:
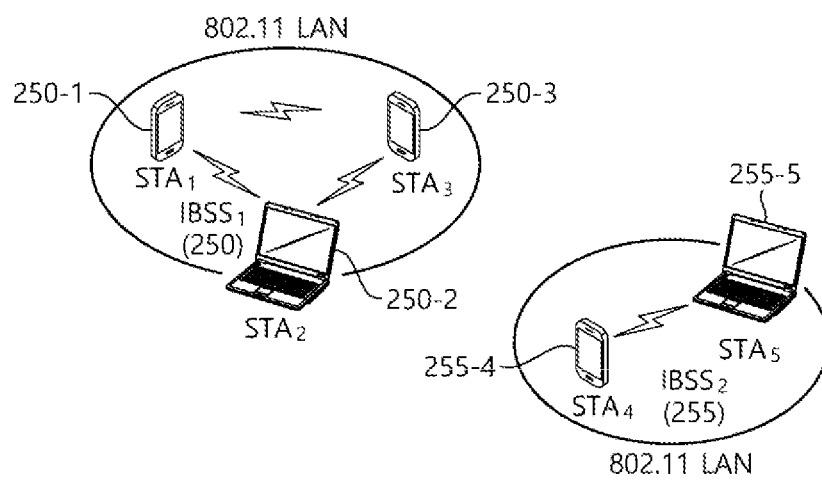

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
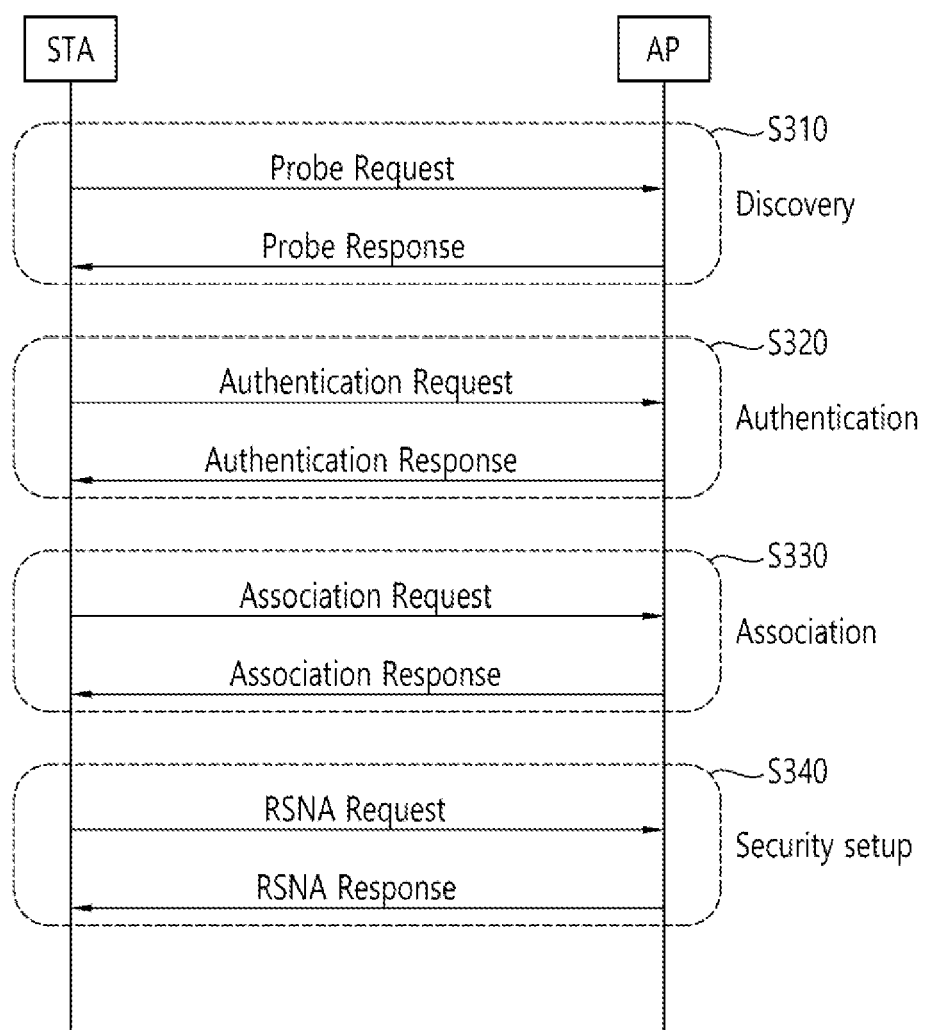
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving, the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
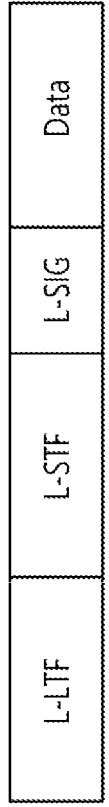
FIG. 4 illustrates an example of a PPDU used in an IEEE standard.
Figure 4:
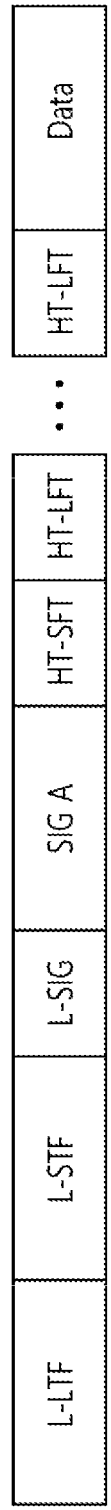
Figure 4:
Figure 4:
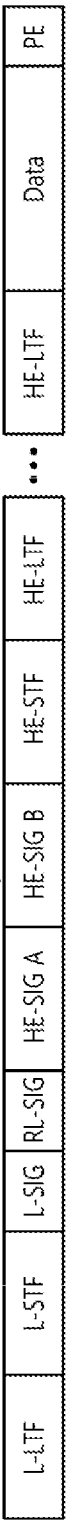

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11 ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
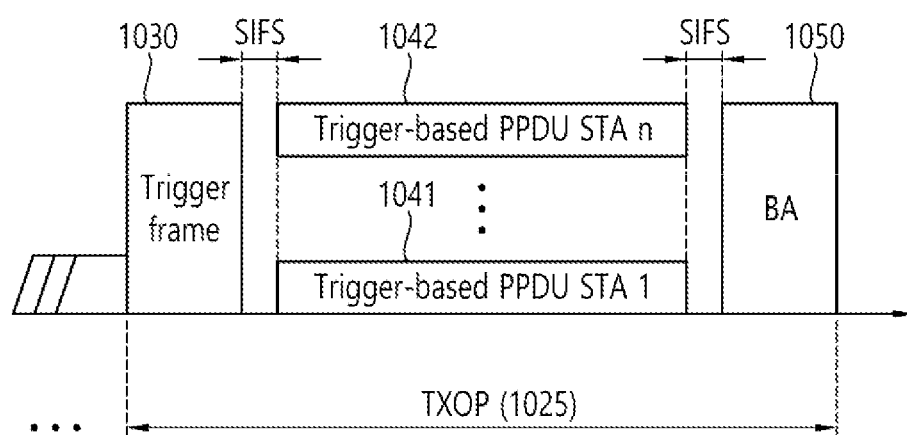
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
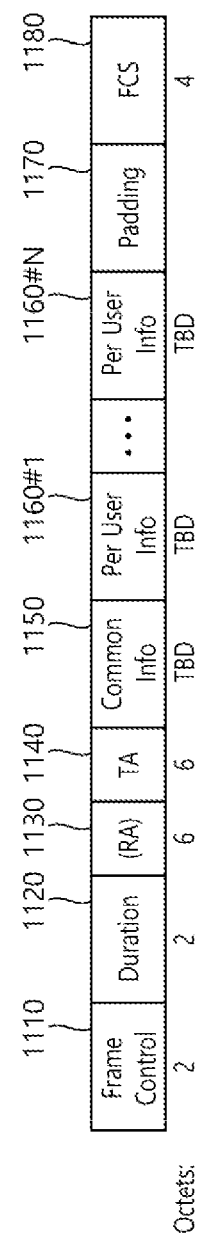
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, peruser information fields 1160#1 to 1160#N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence-field 1180.

Each of the peruser information fields 1160#1 to 1160#N shown in FIG. 6 may include a plurality of subfields.

Figure 7:
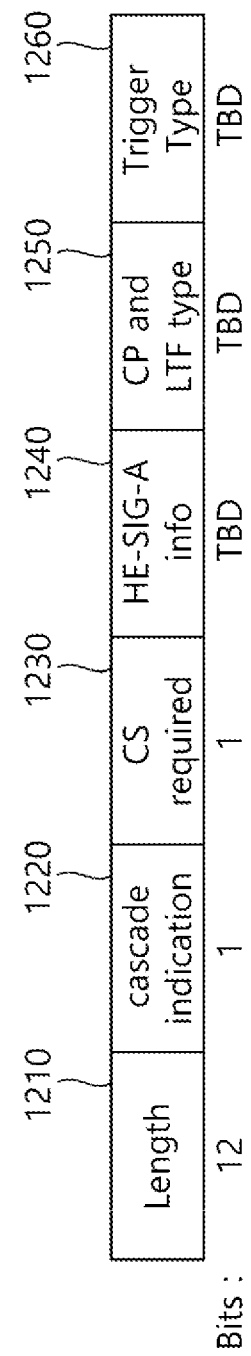
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
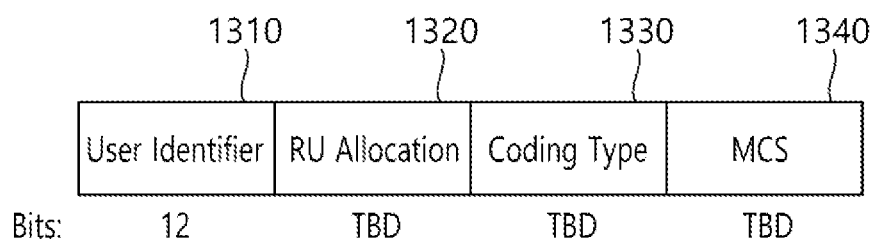
FIG. 8 illustrates an example of a subfield included in a per user information field.

FIG. 8 illustrates an example of a subfield included in a per user information field. A user information field 1300 of FIG. 8 may be understood as any one of the per user information fields 1160#1 to 1160#N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to peruser information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
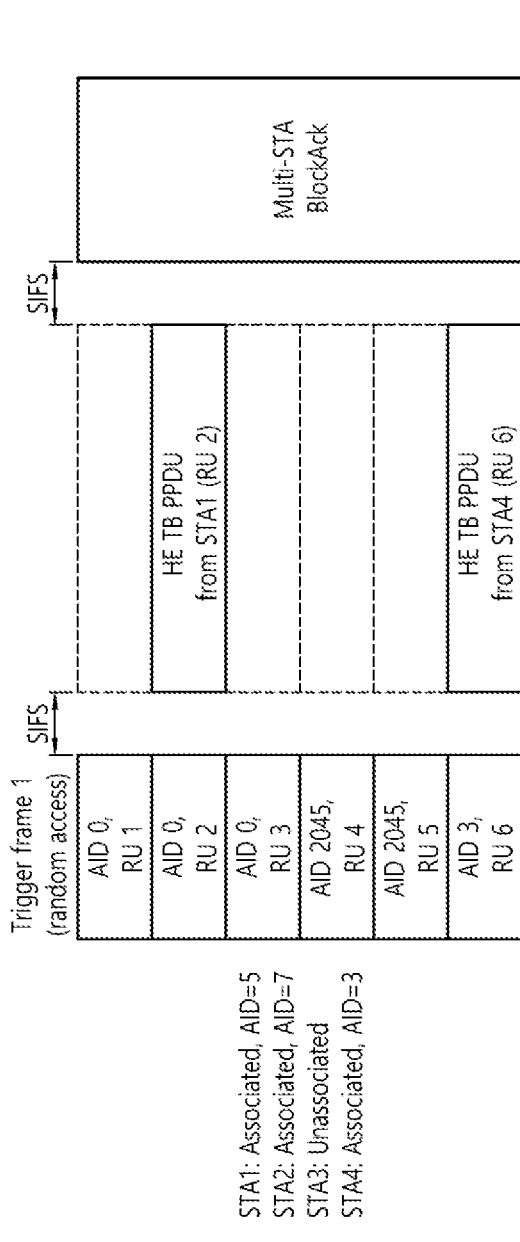
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in a STA of the present specification will be described.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include, a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
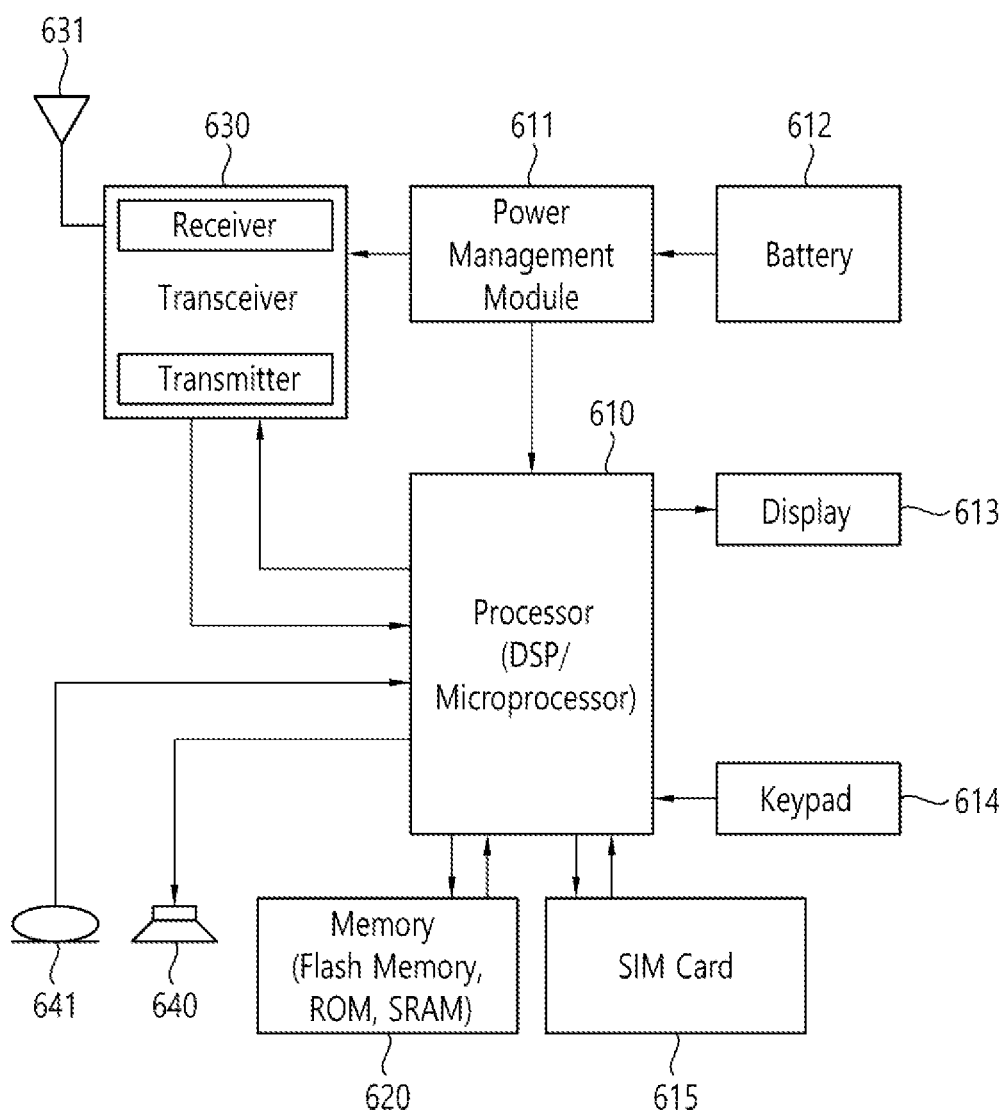
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, technical features of multi-link (ML) supported by the STA of the present specification will be described.

STAs (AP and/or non-AP STA) of the present specification may support multi-link (ML) communication. ML communication may mean communication supporting a plurality of links. Links related to ML communication may include channels (e.g., 20/40/80/160/240/320 MHz channels) of the 2.4 GHz band, the 5 GHz band, and the 6 GHz band.

A plurality of links used for ML communication may be set in various ways. For example, a plurality of links supported by one STA for ML communication may be a plurality of channels in the 2.4 GHz band, a plurality of channels in the 5 GHz band, and a plurality of channels in the 6 GHz band. Alternatively, a plurality of links may be a combination of at least one channel within the 2.4 GHz band (or 5 GHz/6 GHz band) and at least one channel within the 5 GHz band (or 2.4 GHz/6 GHz band). Meanwhile, at least one of a plurality of links supported by one STA for ML communication may be a channel to which preamble puncturing is applied.

The STA may perform ML setup to perform ML communication. ML setup may be performed based on management frames or control frames such as Beacon, Probe Request/Response, and Association Request/Response. For example, information on ML setup may be included in element fields included in Beacon, Probe Request/Response, and Association Request/Response.

When ML setup is completed, an enabled link for ML communication may be determined. The STA may perform frame exchange through at least one of a plurality of links determined as an enabled link. For example, an enabled link may be used for at least one of a management frame, a control frame, and a data frame.

When one STA supports a plurality of Links, a transmitting/receiving device supporting each Link may operate like one logical STA. For example, one STA supporting two links may be expressed as one ML device (Multi Link Device; MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

More specific features of the ML setup are described below.

An MLD (AP MLD and/or non-AP MLD) may transmit information about a link that the corresponding MLD can support through ML setup. Link-related information may be configured in various ways. For example, link-related information includes at least one of 1) information on whether the MLD (or STA) supports simultaneous RX/TX operation, 2) information on the number/upper limit of uplink/downlink links supported by the MLD (or STA), 3) information on the location/band/resource of uplink/downlink link supported by MLD (or STA), 4) type of frame available or preferred in at least one uplink/downlink link (management, control, data etc.), 5) available or preferred ACK policy information on at least one uplink/downlink link, and 6) information on available or preferred TID (traffic identifier) on at least one uplink/downlink link. The TID is related to the priority of traffic data and is represented by 8 types of values according to the conventional wireless LAN standard. That is, 8 TID values corresponding to 4 access categories (AC) (AC BK (background), AC_BE (best effort), AC_VI (video), AC_VO (voice)) according to the conventional wireless LAN standard may be defined.

For example, it may be set in advance that all TIDs are mapped for uplink/downlink links. Specifically, if negotiation is not done through ML setup, all TIDs may be used for ML communication, and if mapping between uplink/downlink links and TIDs is negotiated through additional ML setup, the negotiated TIDs may be used for ML communication.

A plurality of links that can be used by the transmitting MLD and the receiving MLD related to ML communication can be set through ML setup, and this can be called an enabled link. The enabled link can be called differently in a variety of ways. For example, it may be called various expressions such as a first link, a second link, a transmitting link, and a receiving link.

After the ML setup is complete, the MLD may update the ML setup. For example, the MLD may transmit information about a new link when updating information about a link is required. Information about the new link may be transmitted based on at least one of a management frame, a control frame, and a data frame.

The device described below may be the apparatus of FIGS. 1 and/or 11, and the PPDU may be the PPDU of FIG. 10. A device may be an AP or a non-AP STA. A device described below may be an AP multi-link device (MLD) or a non-AP STA MLD supporting multi-link.

In EHT (extremely high throughput), a standard being discussed after 802.11ax, a multi-link environment in which one or more bands are simultaneously used is considered. When a device supports multi-link, the device can simultaneously or alternately use one or more bands (e.g., 2.4 GHz, 5 GHz, 6 GHz, 60 GHz, etc.).

In the following specification, MLD means a multi-link device. The MLD has one or more connected STAs and has one MAC service access point (SAP) that communicates with the upper link layer (Logical Link Control, LLC). MLD may mean a physical device or a logical device. Hereinafter, a device may mean an MLD.

In the following specification, a transmitting device and a receiving device may mean MLD. The first link of the receiving/transmitting device may be a terminal (e.g., STA or AP) included in the receiving/transmitting device and performing signal transmission/reception through the first link. The second link of the receiving/transmitting device may be a terminal (e.g., STA or AP) that transmits/receives a signal through the second link included in the receiving/transmitting device.

In IEEE802.11be, two types of multi-link operations can be supported. For example, simultaneous transmit and receive (STR) and non-STR operations may be considered. For example, STR may be referred to as asynchronous multi-link operation, and non-STR may be referred to as synchronous multi-link operation. Multi-links may include multi-bands. That is, multi-links may mean links included in several frequency bands or may mean multiple links included in one frequency band.

EHT (11be) considers multi-link technology, where multi-link may include multi-band. That is, multi-link can represent links of several bands and multiple multi-links within one band at the same time. Two major multi-link operations are being considered. Asynchronous operation, which enables TX/RX simultaneously on several links, and synchronous operation, which is not possible, are being considered. Hereinafter, a capability that enables simultaneous reception and transmission on multiple links is referred to as STR (simultaneous transmit and receive), an STA having STR capability is referred to as STR MLD (multi-link device), and an STA that does not have STR capability is referred to as a non-STR MLD.

1. Technical Features Related to Multi-Link Device

As mentioned above, the multi-link system in 802.11be is a system in which multiple STAs (AP/Non-AP) are co-located in one device (Multi-Link Device (MLD)), and the performance of the wireless network can be increased.

In addition, a specific TID is mapped to a specific link(s) among enabled/available links, so that traffic for that TID can be transmitted and received through the designated link(s). enabled/available) links.

Also, as mentioned above, the AP may transmit buffered traffic indication information for multiple links through one link or transmit buffered traffic indication information for another link. In this case, only one link among available (/enabled) multiple links operates in power saving mode, and other links exist in doze state, and traffic indication for other links is displayed through a link operating in power saving mode. Upon reception, the terminal transitions the corresponding link(s) or terminal(s) to the awake state and expects to receive the corresponding traffic. In this case, assuming that TIDs are mapped to all available links, the UE can awake all available links. At this time, if the size of data to be actually transmitted from the AP is not large, instead of transitioning all available links to the awake state, after transitioning only specific link(s) to awake, frame transmission/reception is performed through the awake links.

2. Embodiments Applicable to this Specification

In the existing single link operation, since traffic indication only gives information on whether or not there is traffic for a corresponding terminal (link), the corresponding terminal (link) is awake, and it notifies the AP that it has been awake (e.g., PS-Poll frame or QoS Null/data frame transmission) to receive the DL frame through the corresponding single link.

However, when a non-AP device (MLD) with multi-link has multiple links with an associated AP MLD, a specific TID is mapped to a specific link and non-AP STAs in the non-AP MLD enter power saving mode. When traffic for the non-AP MLD is received, the AP MLD may set the corresponding bit of the TIM bitmap to 1 for STAs corresponding to the link connected to the TID of the traffic and transmit it to the non-AP MLD. The non-AP STA/non-AP MLD receives the TIM bitmap and knows which link the AP has traffic on.

If the TIDs of the non-AP MLD are mapped to all available (enabled/available) links, in order to wake up non-AP STAs corresponding to all links, the AP may set and transmit bits corresponding to STAs to 1 in the TIM bitmap. In this case, since the non-AP MLD does not know how much data the AP MLD actually has, all STAs mapped to available links must wake up or only specific STAs may be implemented, but this may also be inaccurate. Transitioning all STAs from doze state to awake state has the advantage of quickly receiving data, but this may increase power consumption of the non-AP MLD because the awakened STAs must stay in the doze state for a long time until receiving DL data.

Figure 12:
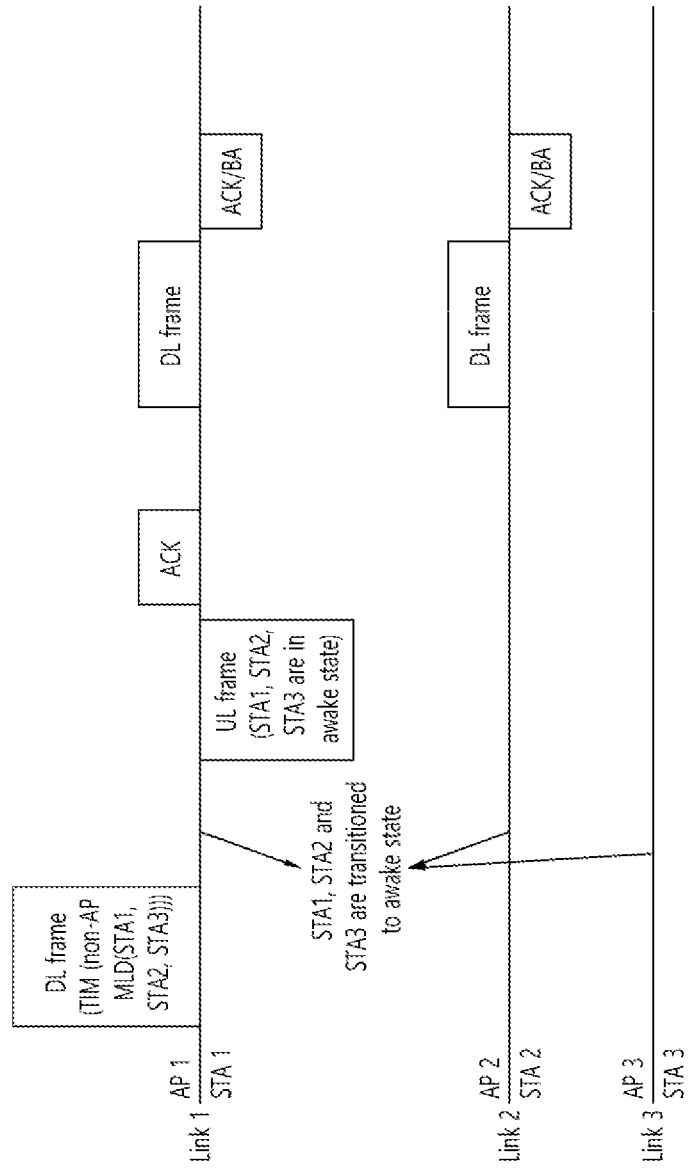
FIG. 12 shows an example in which an AP MLD informs a non-AP MLD that there is buffered traffic for all links in multi-link operation.

Method 0: When the AP receives the traffic for the TID mapped to all available links in the non-AP MLD, the AP transmits a non-After notifying the AP MLD, the non-AP MLD uses this information to transition the state of the non-AP STA corresponding to each link to the awake state. FIG. 12 shows an example of this.

FIG. 12 shows an example in which an AP MLD informs a non-AP MLD that there is buffered traffic for all links in multi-link operation.

Referring to FIG. 12, APs 1, 2, and 3 exist in the AP MLD, and STA1, 2, and 3 in the Non-AP MLD are associated with APs 1, 2, and 3, respectively. Upon receiving traffic corresponding to the TID mapped to STA1, 2, and 3 (i.e., Link 1, 2, and 3), the AP indicates STAs 1, 2, and 3 that there is buffered traffic. That is, even if there is buffered traffic corresponding to STAs 1, 2, and 3, the AP (or AP MLD) may transmit a traffic indicator to the corresponding STAs in order to awake some of the three STAs. When STA1, 2, and 3 of the non-AP MLD transition to the awake state and transmit a UL frame, they inform the AP MLD (or AP) that STA1, 2, and 3 are awake. The AP transmits a DL frame to two of these STAs (STA1, STA2).

Method 1: AP MLD (or AP) provides one or more of a buffer status report (BSR) for the non-AP MLD, or buffer status report for each STA within the non-AP MLD, or Buffer status reports for each TID in each STA in the non-AP MLD to the non-AP MLD (or non-AP STA).

The buffer status report information of the terminal (or non-AP MLD) transmitted by the AP may include one or more of the following information.

1) Total amount of buffered traffic for non-AP MLD (i.e., queue size all of the non-AP MLD)
2) Total amount of buffered traffic for each STA in the Non-AP MLD (i.e., queue size all of each non-AP STA): That is, information on the sum of all queues for each STA
3) Amount of buffered traffic for each AC (access category, e.g., AC_VI, AC_VO, AC_BE, AC BK) within each non-AP STA: That is, queue information corresponding to each AC is included for each STA.
4) Amount of buffered traffic for each TID in each non-AP STA: That is, queue information corresponding to each TID is included for each STA.
5) The buffered traffic received from STAs in the non-AP MLD is classified for each AC and the amount of buffered traffic is notified: That is, queue size information for each AC for the non-AP MLD is included.
6) The buffered traffic received from STAs in the non-AP MLD is distinguished by TID and the amount of buffered traffic is notified: That is, information on the queue size (amount of buffered traffic) for each TID for the non-AP MLD is included.

In this specification, we propose an embodiment that informs the total amount of buffered traffic of Non-AP MLD, it is natural that one or more of the information items 1) to 6) listed above may be included in the buffer status information for the non-AP MLD transmitted by the AP.

Figure 13:
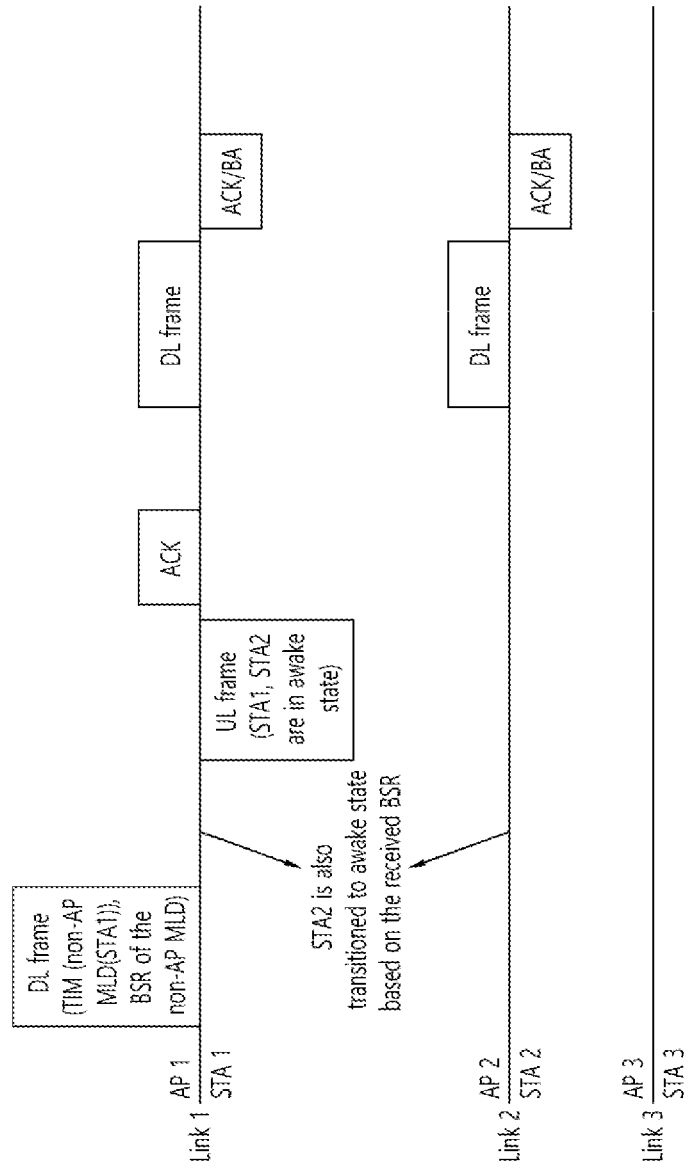
FIG. 13 shows an example of notifying through a DL frame that the AP MLD has buffered traffic for STA 1 in multi-link operation.

When the Non-AP MLD receives BSR information (That is, at least one of BSR information of the non-AP MLD mentioned above, BSR information for each STA in the non-AP MLD, queue size information for each AC in each non-AP STA in the non-AP MLD, BSR information for each TID in each non-AP STA in the corresponding non-AP MLD, BSR information for each AC in the corresponding non-AP MLD, and BSR information for each TID in the corresponding non-AP MLD) corresponding to itself from the AP MLD, based on the corresponding information, the non-AP MLD can determine how many links (i.e., STAs mapped to the links) to be awake. The Non-AP MLD (or non-AP STA) may inform the associated AP MLD (or AP) which STAs (or corresponding links) have been awake. The AP MLD (or AP) may transmit a DL frame through a corresponding link based on information transmitted by the UE (information on which non-AP STA in the non-AP has awake). FIG. 13 shows an example of this.

FIG. 13 shows an example of notifying through a DL frame that the AP MLD has buffered traffic for STA 1 in multi-link operation.

Referring to FIG. 13, APs 1, 2, and 3 exist in the AP MLD, and STAs 1, 2, and 3 in the Non-AP MLD are associated with APs 1, 2, and 3, respectively. When AP MLD (or AP1) transmits a DL frame to STA1 through link 1, an indicator that there is buffered traffic is transmitted to STA1 (or non-AP MLD of STA1) along with the queue size or buffered traffic size (BSR) of the non-AP MLD. When STA1 (or non-AP MLD) receives BSR information from AP, wakes STA2 (link2) and transmits a UL frame to AP (or AP MLD), it transmits information that they are awake (i.e., information that they are ready to receive DL frames), the AP (or AP MLD) transmits a DL frame to STA1 and STA2 through Link 1 and Link 2.

Figure 14:
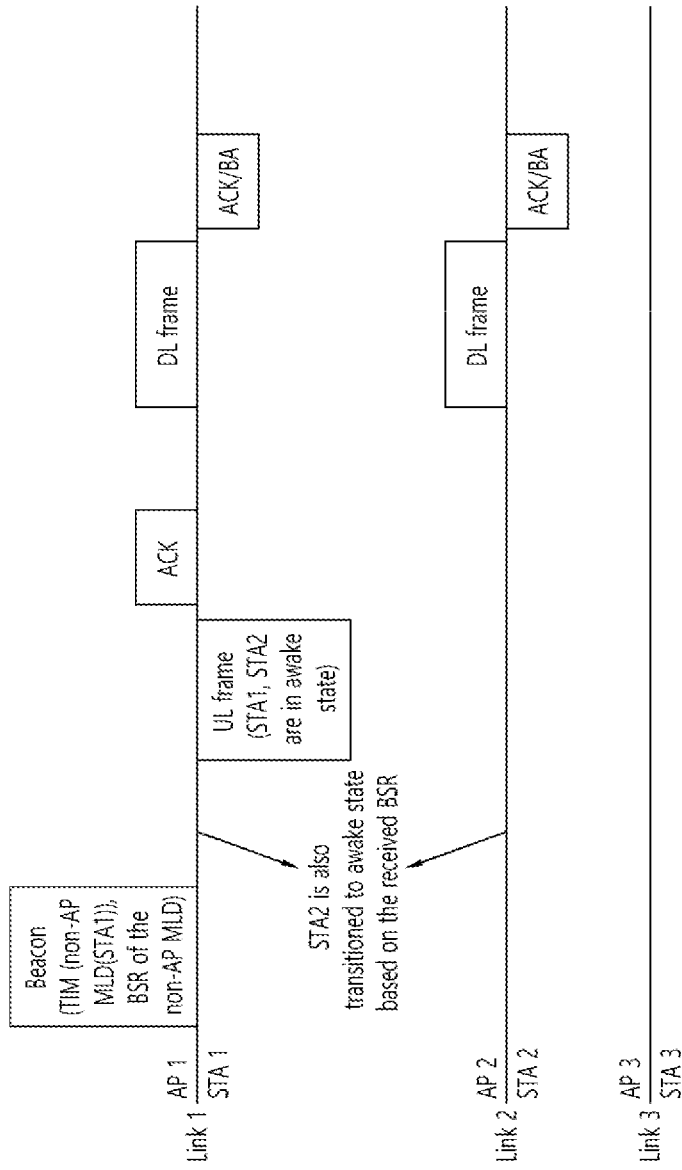
FIG. 14 shows an example in which the AP MLD informs that there is buffered traffic for STA 1 through a beacon frame in multi-link operation.

Detailed delivery method 1-1: When the AP MLD (or AP STA) transmits the multi-link traffic indication map for the buffer status report information for the non-AP MLD (or non-AP STA) defined above, the corresponding frame (For example, Beacon frame) together and transmitted. The Non-AP MLD (or non-AP STA) determines how many links (or STAs corresponding to the links) to be awake among multiple links using the buffer status report information included in the Beacon frame, and the non-AP MLD notifies the AP by transmitting a frame including information on awake links/STAs to the AP. FIG. 14 shows an example of this.

FIG. 14 shows an example in which the AP MLD informs that there is buffered traffic for STA 1 through a beacon frame in multi-link operation.

In FIG. 14, it is assumed that TIDs for non-AP MLDs are all mapped to available links through default TID-to-link mapping. In FIG. 14, when AP1 transmits Beacon through Link1, it can transmit buffered traffic information for other links/other STAs, and since TIDs are mapped to all available links, it transmits a TIM that wakes up only the corresponding STA (in the example, STA1). Non-AP MLD (or STA1) can also wake up STAs for other links because the TID is mapped to all links even if the TIM contains information to wake up only STA1, FIG. 14 shows an example of transitioning STA2 to an additional awake state. Based on the BSR information about the non-AP MLD included in the received Beacon frame, the non-AP MLD can determine how many links to wake up additionally. Non-AP STA1 transmits to AP1 a UL frame including information for knowing which link STAs have transitioned to the awake state, and in FIG. 14, STA1 and STA2 notify that they are in an awake state through a UL frame. Upon receiving the UL frame including information indicating that STA1 and STA2 are awake state, the AP MLD transmits an immediate acknowledgment of the UL frame and transmits buffered traffic (e.g., DL frame) to STA1 and STA2.

Figure 15:
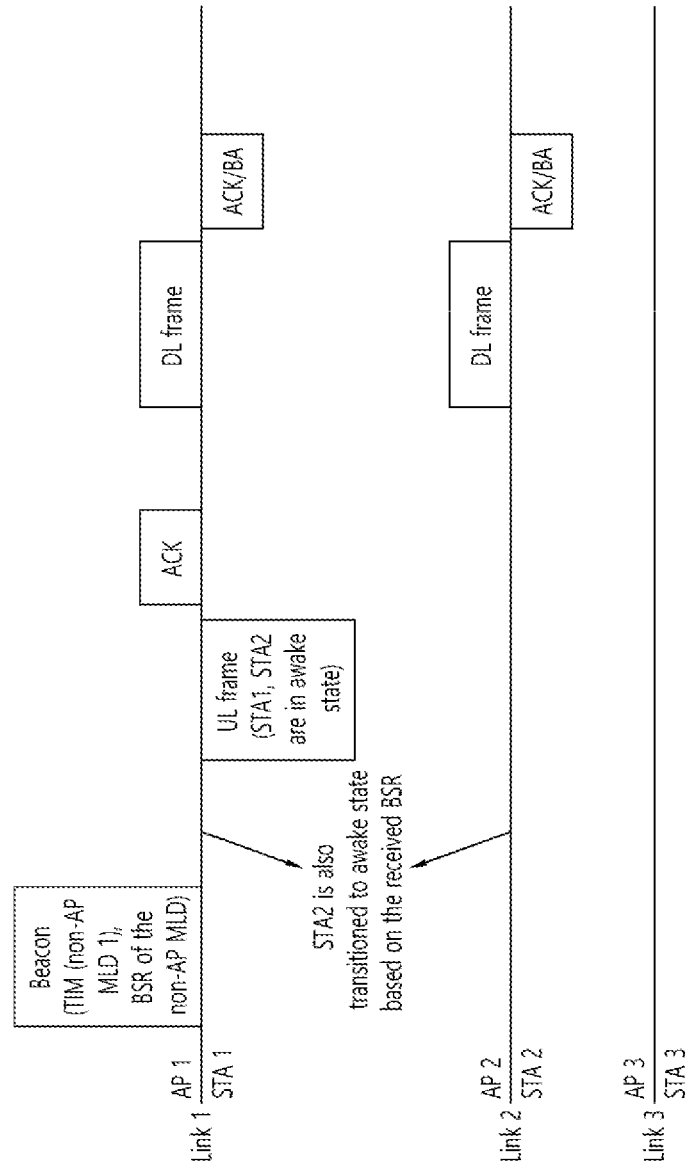
FIG. 15 illustrates an example in which an AP MLD informs that that there is buffered traffic for a non-AP MLD 1 through a beacon frame in multi-link operation.

FIG. 15 illustrates an example in which an AP MLD informs that that there is buffered traffic for a non-AP MLD 1 through a beacon frame in multi-link operation.

In FIG. 15, when AP MLD1 (or AP1) wakes up STAs through TIM, information on non-AP MLD1 is included instead of STA information. STA1 can know that the non-AP MLD1 is an MLD to which the STA1 belongs, and the non-AP MLD can know that TIDs are mapped to multiple links (i.e., all available links). As shown in FIG. 14, the non-AP MLD can determine how many links to additionally wake up based on the BSR information of the non-AP MLD included in the Beacon, and in FIG. 15, only STA2 is awake. The rest of the operation is the same as the example of FIG. 14.

Figure 16:
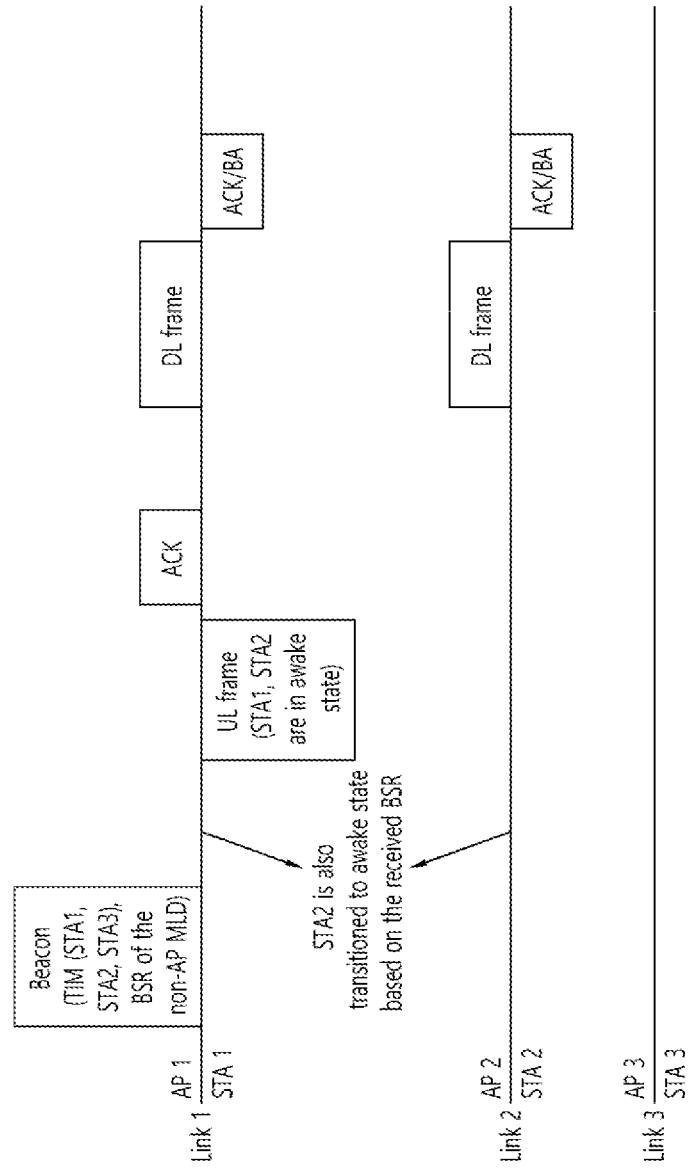
FIG. 16 shows an example of notifying through a beacon frame that the AP MLD has buffered traffic for STAs 1 to 3 in multi-link operation.

FIG. 16 shows an example of notifying through a beacon frame that the AP MLD has buffered traffic for STAs 1 to 3 in multi-link operation.

In FIG. 16, when traffic indication is sent in a beacon, the AP MLD (or AP) indicates STAs (STA1, 2, and 3) for all available links mapped to the TID. Even if the non-AP MLD (or STA) receives the information, it can determine how many links to wake up based on the BSR information about the non-AP MLD included in the beacon, and FIG. 16 shows an example of additionally waking up STA2 for link 2. The rest of the operation is the same as the example of FIG. 14.

2-1. ML-BSR Element Containing BSR Information Included in the Beacon Frame

Figure 17:
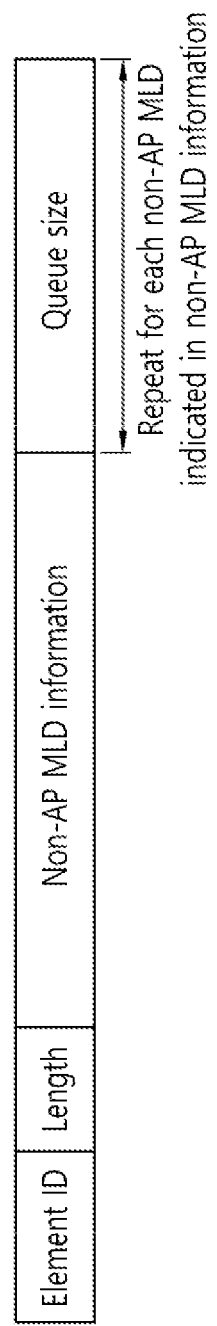
FIG. 17 shows an example of an ML-BSR element including BSR information included in a beacon frame.

FIG. 17 shows an example of an ML-BSR element including BSR information included in a beacon frame.

Non-AP MLD information of FIG. 17 includes information on which non-AP MLD is included. That is, the non-AP STA can see which MLD has been indicated by looking at the Non-AP MLD Information.

Method 1: It can be composed of a field indicating the number of non-AP MLDs and an ID field indicating the non-AP MLDs, and as many non-AP MLD IDs as the number of non-AP MLDs can be included in the information.

Figure 18:
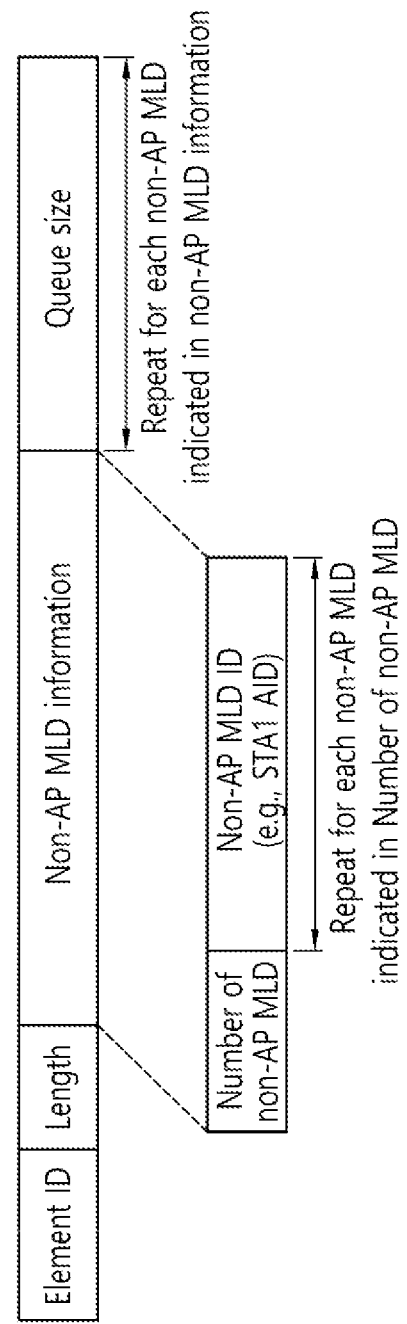
FIG. 18 shows an example of an ML-BSR element using Method 1.

FIG. 18 shows an example of an ML-BSR element using Method 1.

In detail, the Non-AP MLD ID may be the AID of one STA belonging to the Non-AP MLD. In this case, if STAs belonging to the MLD have different AIDs, the STAs belonging to the MLD must know the AIDs of other STAs in the same MLD. If STAs belonging to the MLD have the same AID, there is no need to separately store the AIDs of other STAs.

If the AIDs of STAs can be the same or different, a method for distinguishing them is additionally required.

Method 2: non-AP MLD information may be configured in a bitmap form, and each bit is mapped to each non-AP MLD, so the queue size field for bits (MLDs) set to 1 is included. Additionally, bitmap size information may also be included.

Figure 19:
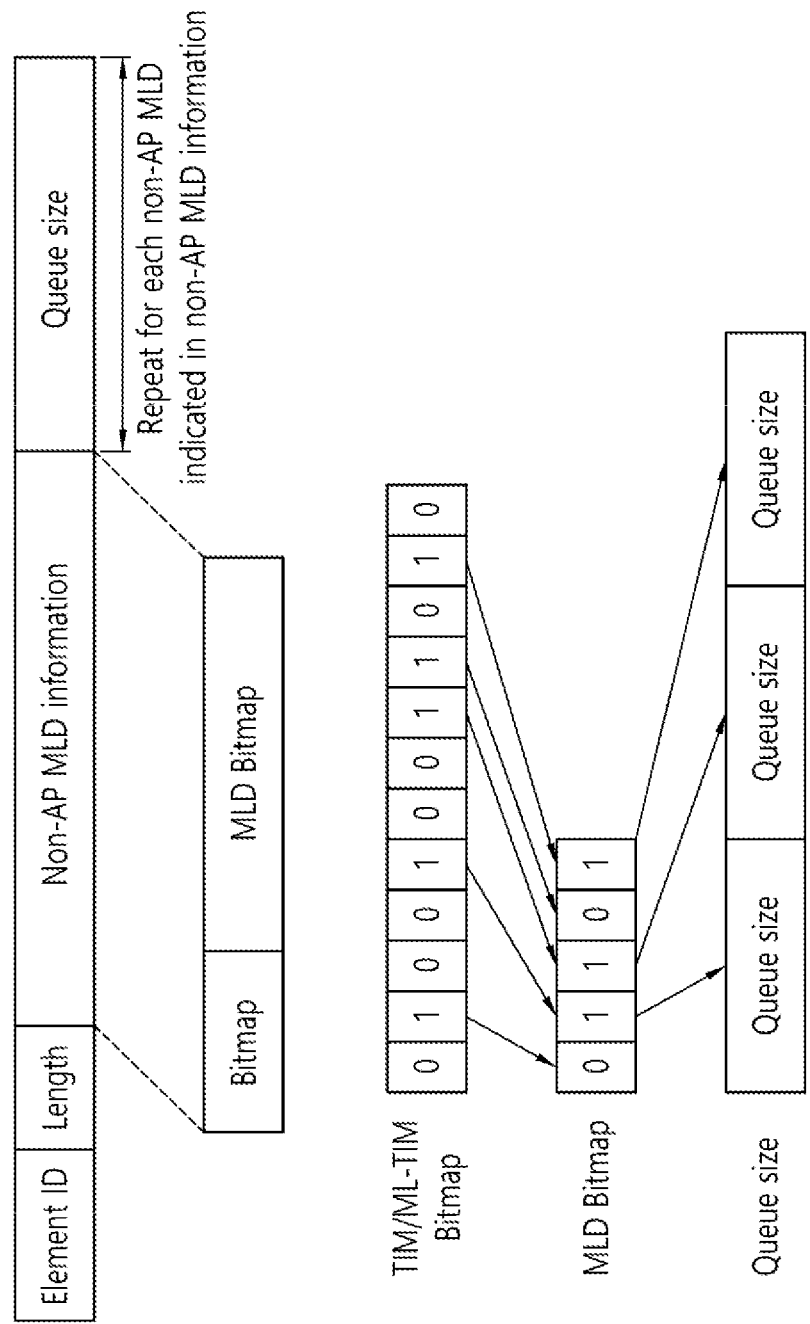
FIG. 19 shows an example of an ML-BSR element using Method 2.

When the same AID is assigned to STAs in the non-AP MLD, the non-AP MLD Information bitmap may be configured with bits set to 1 in the TIM bitmap (or ML (Multi-link) TIM Bitmap), queue size information is included as many as the number of bits set to 1 in the non-AP MLD Information bitmap. If the bitmap size information is included together, the MLD Bitmap size is determined as much as the corresponding size, the non-AP MLD (or non-AP STA) indicated by the first bit in the MLD bitmap becomes the MLD (or STA) corresponding to the first bit set to 1 in the TIM bitmap (or ML TIM Bitmap), and the following bit becomes the MLD (or STA) corresponding to the second bit set to 1. FIG. 19 shows an example of this.

FIG. 19 shows an example of an ML-BSR element using Method 2.

In FIG. 19, Bitmap size may be included as optional. If the bitmap size is included, the size of the MLD Bitmap is determined based on the bitmap size value, and as above, the first bit of the MLD bitmap corresponds to the MLD/STA set to the first 1 of the TIM/ML-TIM Bitmap, the second bit corresponds to ML/STA set to second 1 of the TIM/ML-TIM Bitmap, and the other bits are configured in the same way. Queue size is included as much as the number of bits set to 1 in the MLD Bitmap (i.e., the number of MLD/STAs). If Bitmap size is not included, the size of the MLD Bitmap is set to the total number of bits set to 1 in the bitmap pointing to the non-STA/non-AP MLD in the TIM/ML-TIM Bitmap. In the above example, since the number of 1's in the partial virtual bitmap of the TIM element is all 5 bits, the size of the MLD Bitmap is determined to be 5 bits.

If the AIDs of STAs in the Non-AP MLD always have different values, the STAs store (remember) the AIDs of other STAs belonging to the same MLD. Therefore, when looking at the MLD Bitmap, even if a bit indicating another STA belonging to the same MLD is set to 1 even if the bit does not correspond to itself, it is regarded as pointing to its own MLD and operates. As above, the size of the MLD Bitmap is determined by the size indicated by the bitmap size, and as above, the first bit of the MLD corresponds to the MLD/STA set to the first 1 of the TIM/ML-TIM Bitmap, the second bit corresponds to ML/STA set to second 1 of the TIM/ML-TIM Bitmap, and the other bits are configured in the same way.

If the AIDs of STAs can be the same or different, a method for distinguishing them may be additionally required.

Queue size of non-AP MLD: Queue size information for each non-AP MLD indicated by Non-AP MLD information is included, and the queue size is repeated as many times as the number of non-AP MLDs indicated. That is, the total size of the queue size is determined as (the size of one queue size*the number of non-AP MLDs).

Figure 20:
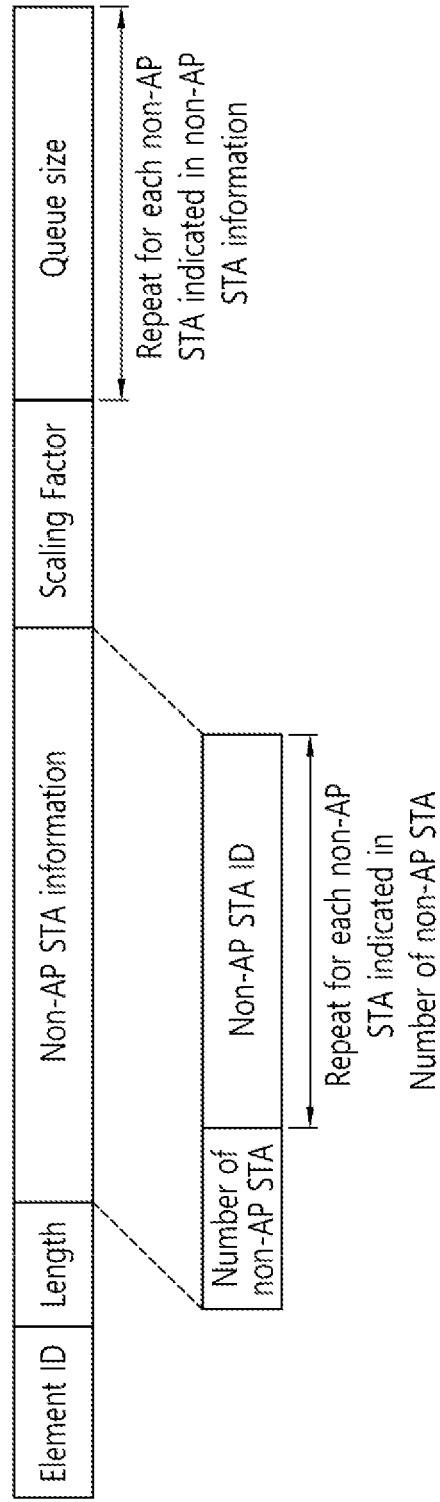
FIG. 20 shows an example of a format in which Scaling Factor information is additionally included in the ML-BSR element of FIG. 18.
Figure 21:
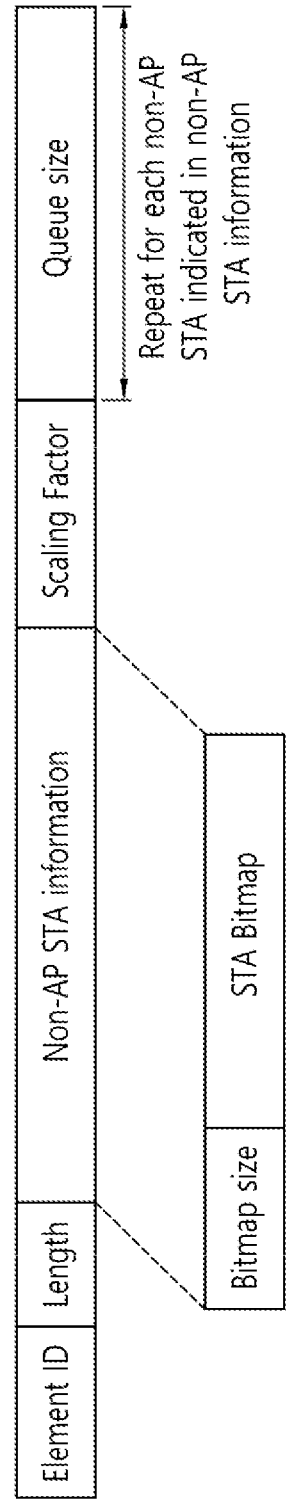
FIG. 21 shows an example of a format in which Scaling Factor information is additionally included in the ML-BSR element of FIG. 19.

Scaling factor information indicating unit information of the queue size field may be additionally included, and FIGS. 20 and 21 show examples thereof.

FIG. 20 shows an example of a format in which Scaling Factor information is additionally included in the ML-BSR element of FIG. 18.

FIG. 21 shows an example of a format in which Scaling Factor information is additionally included in the ML-BSR element of FIG. 19.

The table below shows an example of Scaling Factor subfield encoding.

TABLE 1

| Scaling Factor subfield | Scaling factor, SF, in octets |
|---|---|
| 0 | 16 |
| 1 | 256 |
| 2 | 2048 |
| 3 | 32768 |

The Scaling Factor subfield indicates the unit (SF) in octets of the Queue size subfield.

Queue size is used to indicate the total size of all MSDUs and A-MSDUs buffered by the AP for the non-AP MLD, in conjunction with the SF value of the Scaling Factor subfield. When the value of the Queue size subfield is A and the Scaling Factor subfield is 1, it indicates that the total size of all MSDUs and A-MSDUs buffered by the AP for the non-AP MLD is about A×256 octets, and the non-AP MLD (or STA) can also know this. The queue size represents an example and may be expressed differently.

Figure 22:
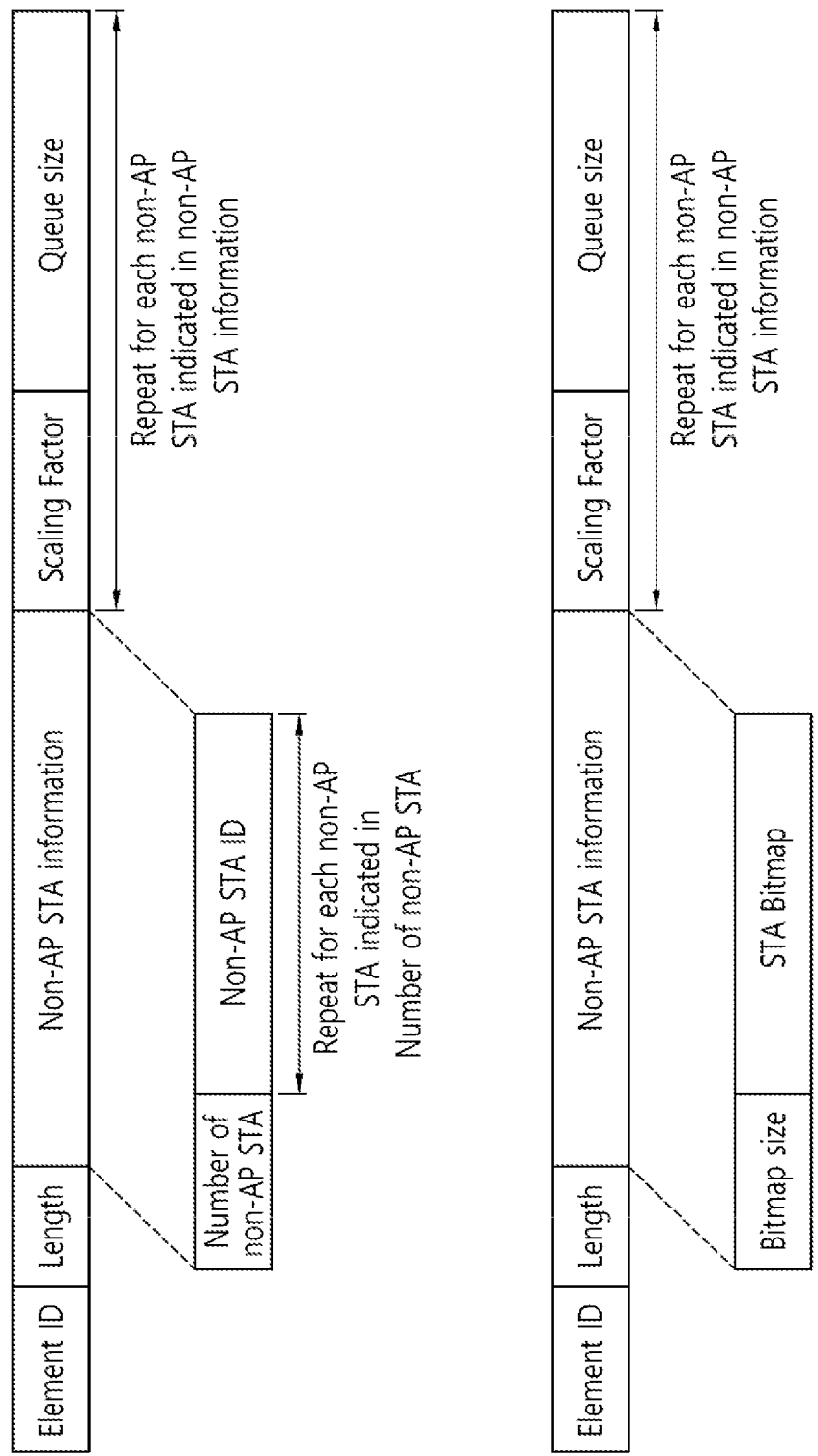
FIG. 22 shows an example of an ML-BSR element having a scaling factor for each non-AP MLD.

The scaling factor may have different values for each non-AP MLD, and FIG. 22 shows an example of this.

FIG. 22 shows an example of an ML-BSR element having a scaling factor for each non-AP MLD.

As in FIG. 22, scaling factor and queue size are repeated as many times as the number of non-AP MLDs or STAs indicated in Non-AP STA Information. For example, if the number of bits set to 1 is 5 in the STA Bitmap, 5 {Scaling Factor subfield, Queue Size subfield} will follow.

<Indicator of Whether the Queue Size Exceeds the Threshold>

However, as in the above-described embodiment, if the queue size is directly indicated, the amount of information increases, resulting in an increase in overhead. Hereinafter, an ML-BSR element containing only information on whether or not the queue size exceeds a specific threshold value is proposed.

Figure 23:
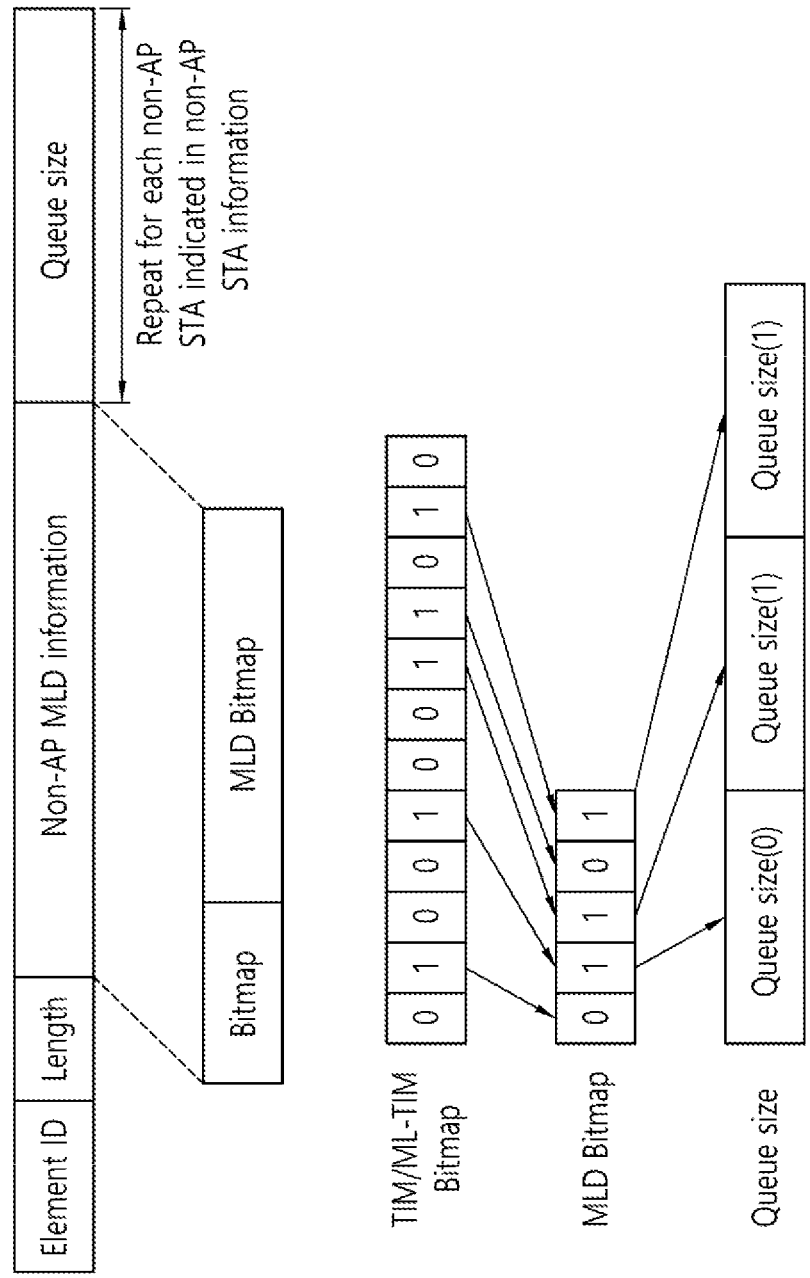
FIG. 23 shows an example of an ML-BSR element indicating whether the queue size exceeds a specific threshold value.

For example, if it is configured with 1 bit for each MLD, if the value of the bit is 0, it indicates that the BSR information (i.e., the queue size value) exceeds a specific Threshold value, and if this bit has a value of 1, it indicates that the BSR information exceeds a certain Threshold value. FIG. 23 shows an example of this.

FIG. 23 shows an example of an ML-BSR element indicating whether the queue size exceeds a specific threshold value.

In FIG. 23, the total number of bits of the queue size is 3 bits, and the first MLD among the three STA/MLDs set to 1 in the STA/MLD Bitmap indicates that the Threshold value is not exceeded (=0) and the second and third MLD indicate that the Threshold value is exceeded (=1).

The threshold value mentioned above can be determined in the following way.

Figure 24:
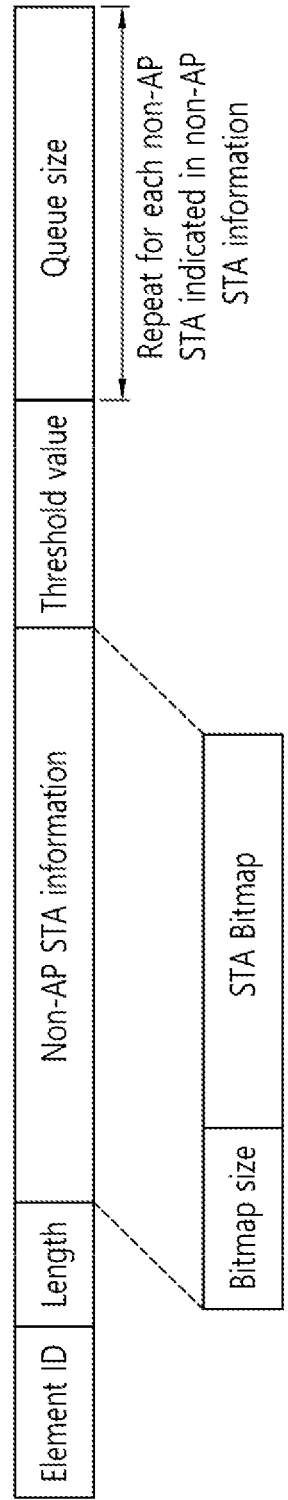
FIG. 24 shows an example of a format in which threshold value information is additionally included in the ML-BSR element of FIG. 23.

1) It is set as a fixed value in the specification/standard. Since this is a fixed value, it cannot have flexibility.
2) AP can announce. When transmitting a DL frame (in particular, a broadcast frame) such as Beacon or Probe Response, it can be included and transmitted. For example, it can be transmitted like the above queue size information. FIG. 24 shows an example of this.

FIG. 24 shows an example of a format in which threshold value information is additionally included in the ML-BSR element of FIG. 23.

According to the format of FIG. 24, one Threshold value is equally applied to all MLD/STAs.

Figure 25:
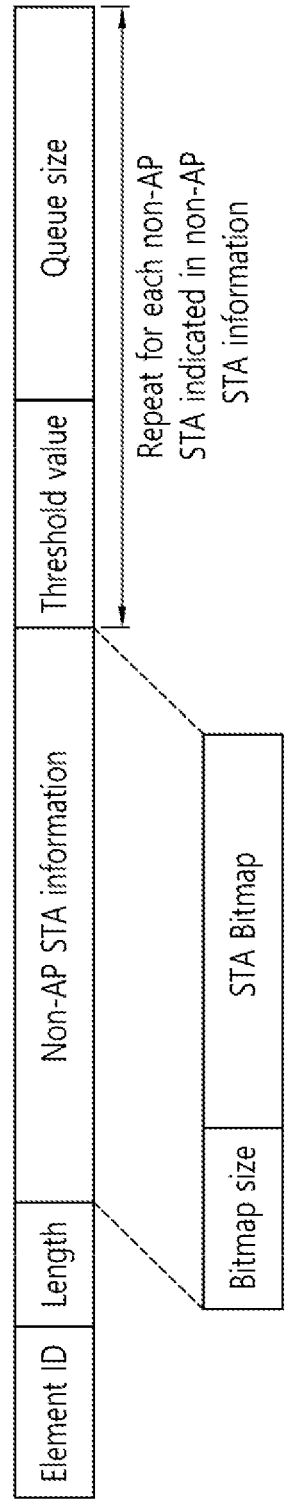
FIG. 25 shows an example of an ML-BSR element having threshold value information for each non-AP MLD.

FIG. 25 shows an example of an ML-BSR element having threshold value information for each non-AP MLD.

Referring to FIG. 25, each MLD/STA may have a different Threshold value, and each MLD may be transmitted with a queue size.

As an example, the element may be included in a Beacon frame or a probe response as an element or field of another type and transmitted.

Figure 26:
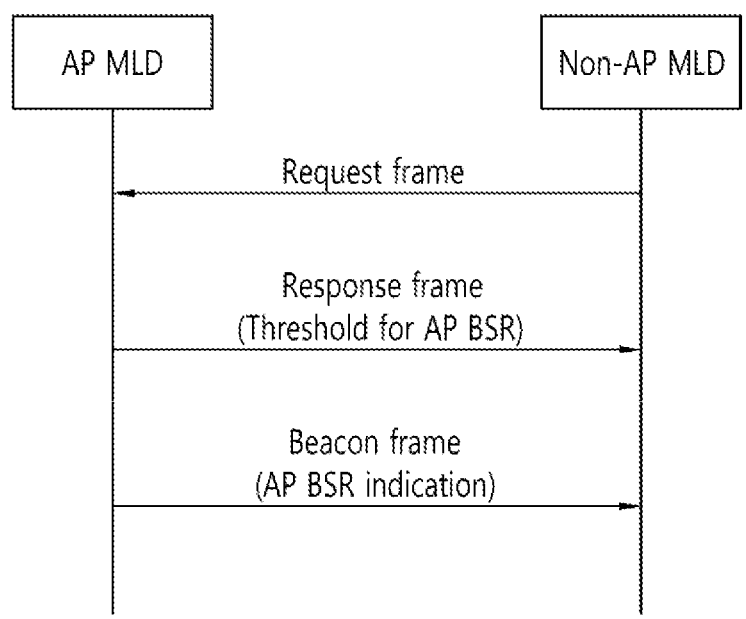
FIG. 26 shows an example of negotiating a threshold value based on a request/response frame.
Figure 27:
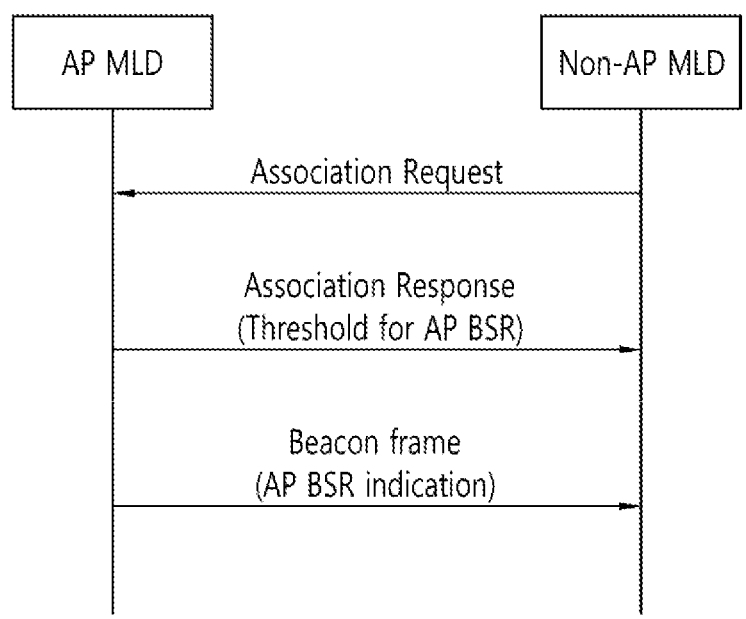
FIG. 27 shows an example of negotiating a threshold value based on an association request/response frame.
Figure 28:
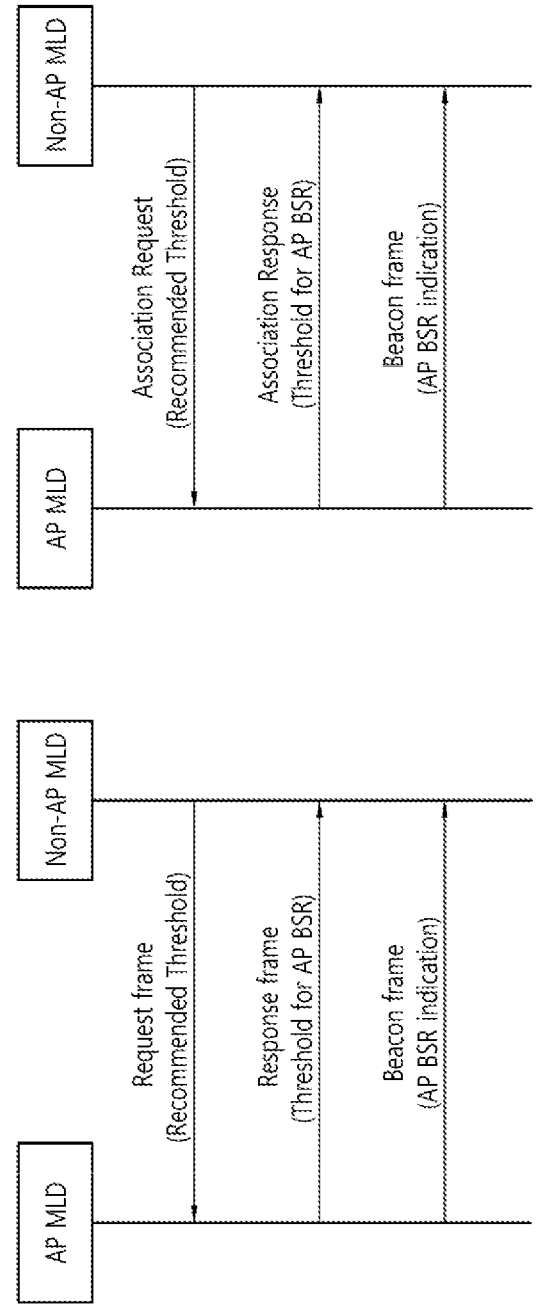
FIG. 28 shows an example of transmitting a recommended Threshold value in a request frame.

3) AP MLD and non-AP MLD can negotiate threshold values in advance. FIGS. 26 to 28 show examples of this.

<Threshold Value Negotiation Method>

FIG. 26 shows an example of negotiating a threshold value based on a request/response frame.

Referring to FIG. 26, when the Non-AP MLD transmits a Request frame and the AP MLD transmits a Response frame, it includes the Threshold value for AP BSR and sends it. After this, when the beacon frame is sent with the AP BSR indication included, the non-AP MLD can use the value included in the AP BSR indication to know whether the BSR is less than the threshold value determined through negotiation or more BSR.

As for the Request and Response frame, an Association Request/Response frame may be one example, and FIG. 27 shows an example thereof.

FIG. 27 shows an example of negotiating a threshold value based on an association request/response frame.

Non-AP MLD can transmit by including the recommended threshold in the request frame. 28 shows an example of this.

FIG. 28 shows an example of transmitting a recommended Threshold value in a request frame.

Referring to FIG. 28, Association Request and Association Response are examples of Request & Response frames, and threshold values may be negotiated through other Request/Response frames.

Figure 29:
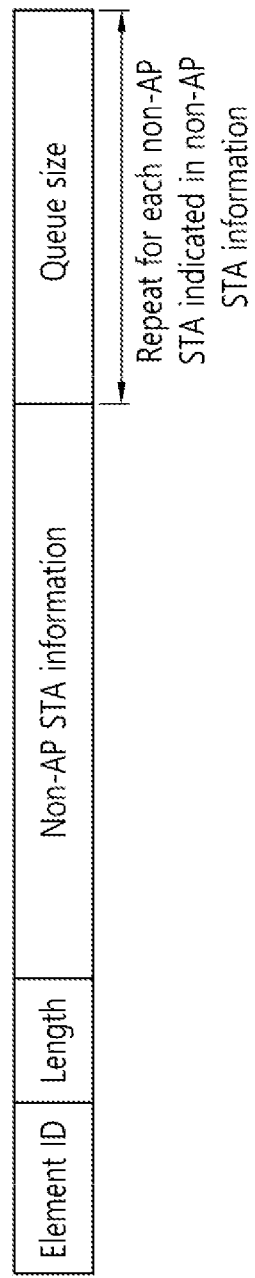
FIG. 29 shows another example of an ML-BSR element including BSR information included in a Beacon frame.

FIG. 29 shows another example of an ML-BSR element including BSR information included in a Beacon frame.

Non-AP STA information: Indicates which non-AP STAs are included. That is, the non-AP STA can see the Non-AP STA Information to know which non-AP STA is indicated and which queue size is included.

Figure 30:
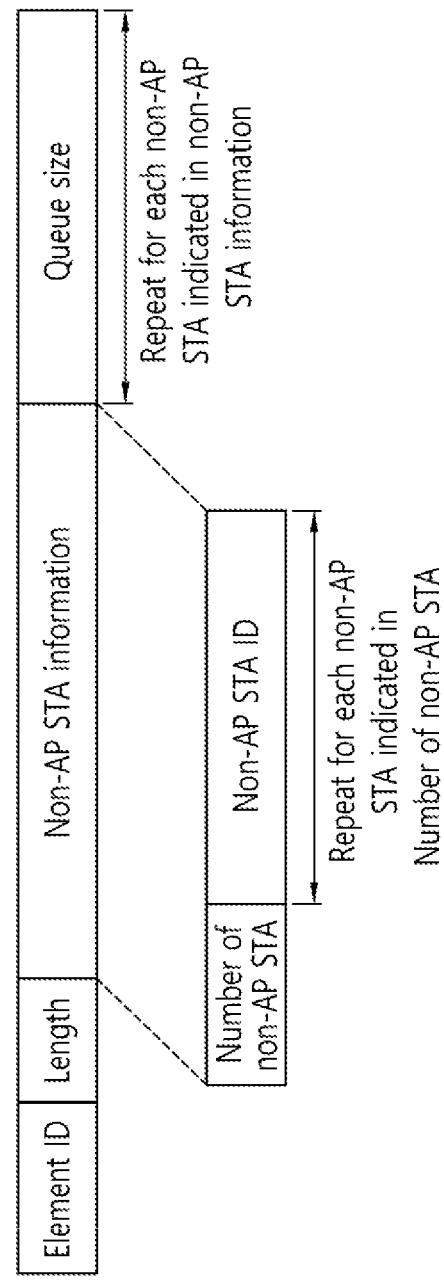
FIG. 30 shows another example of an ML-BSR element.

Method 1: It may consist of a field indicating the number of non-AP STAs and an ID field indicating non-AP STAs, and non-AP STA IDs are included as many as the number of non-AP STAs. FIG. 30 shows an example of this.

FIG. 30 shows another example of an ML-BSR element.

Referring to FIG. 30, when different AIDs are always assigned to STAs in a Non-AP MLD (e.g., unique AIDs are assigned to STAs in an MLD in one AID space), non-AP STA IDs are included as many as the number of non-AP STAs that should include the queue size.

If STAs within the Non-AP MLD are assigned the same AID, a method for distinguishing them is required. Non-AP STA ID information includes non-AP STA ID and link information (e.g., Link ID) to distinguish STAs in the MLD.

Method 2: Non-AP STA information may be configured as a bitmap, and since each bit is mapped to each non-AP STA, the queue size for bits set to 1 (i.e., STAs) is included. Additionally, bitmap size information may also be included.

Figure 31:
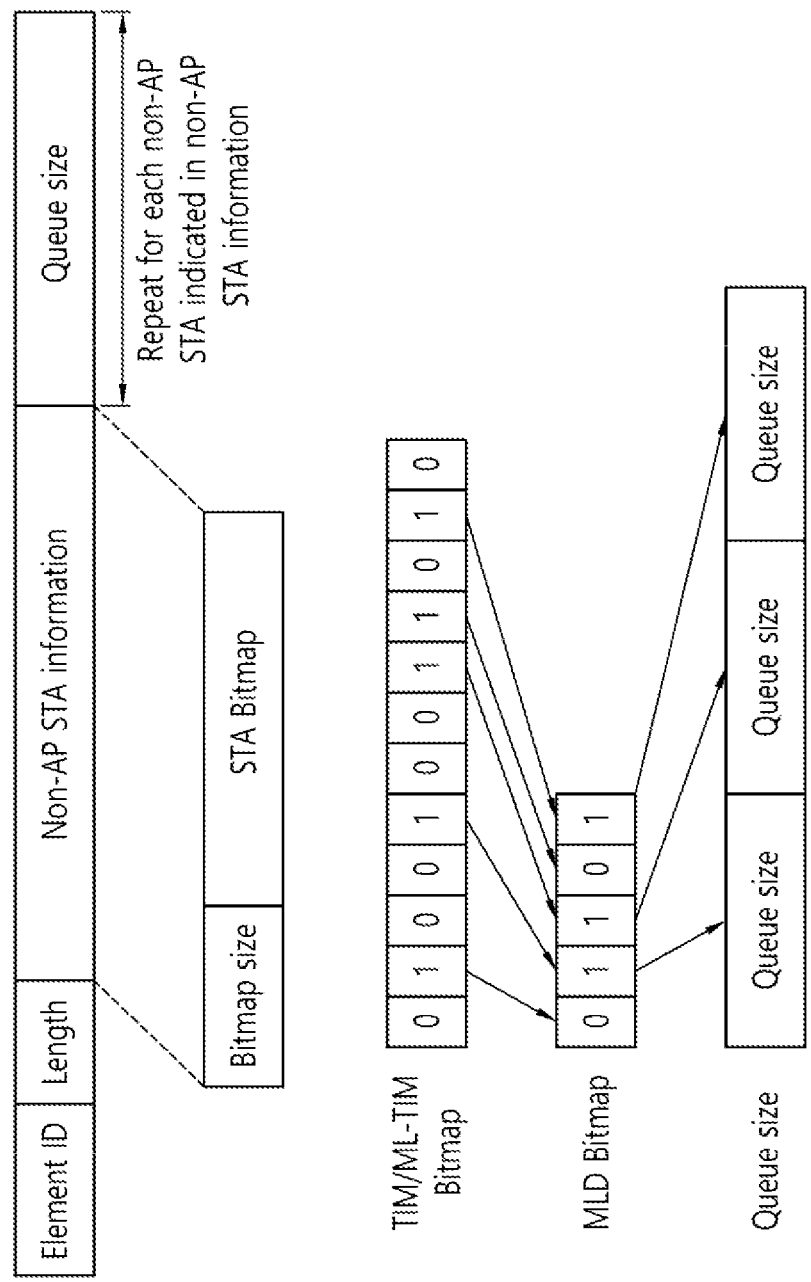
FIG. 31 shows another example of an ML-BSR element.

If the AIDs of STAs in the Non-AP MLD always have different values and the TIM element can indicate all STAs in the non-AP MLD, the terminals set to 1 in the TIM Bitmap are configured as Non-AP STA Information terminals. If there is bitmap size information, the non-AP STA bitmap size is determined as much as the size indicated in the size field, and if there is no bitmap size information, non-AP STA as many bits as set to 1 in the TIM bitmap (or ML-TIM Bitmap) Bitmap size is determined. Therefore, the first bit of the STA Bitmap corresponds to the first MLD/STA set to 1 in the TIM/ML-TIM Bitmap, the second bit corresponds to the ML/STA set to 1 in the second TIM/ML-TIM Bitmap, and the rest Bits are also configured in the same way. FIG. 31 shows an example of this.

FIG. 31 shows another example of an ML-BSR element.

In FIG. 31, Bitmap size may be included as optional. If the bitmap size is included, the size of the MLD Bitmap is determined based on the bitmap size value, and as above, the first bit of the STA bitmap corresponds to the MLD/STA set to the first 1 of the TIM/ML-TIM Bitmap, the second bit corresponds to ML/STA set to second 1 of the TIM/ML-TIM Bitmap, and the other bits are configured in the same way. Queue size is included as much as the number of bits set to 1 (i.e., the number of MLD/STAs) in the MLD Bitmap.

Queue size of non-AP STA: Queue size information for each non-AP STA indicated by Non-AP STA information is included, and the queue size is repeated as many times as the number of non-AP STAs indicated. That is, the total size of the queue size is determined as (the size of one queue size*the number of non-AP STAs).

Figure 32:
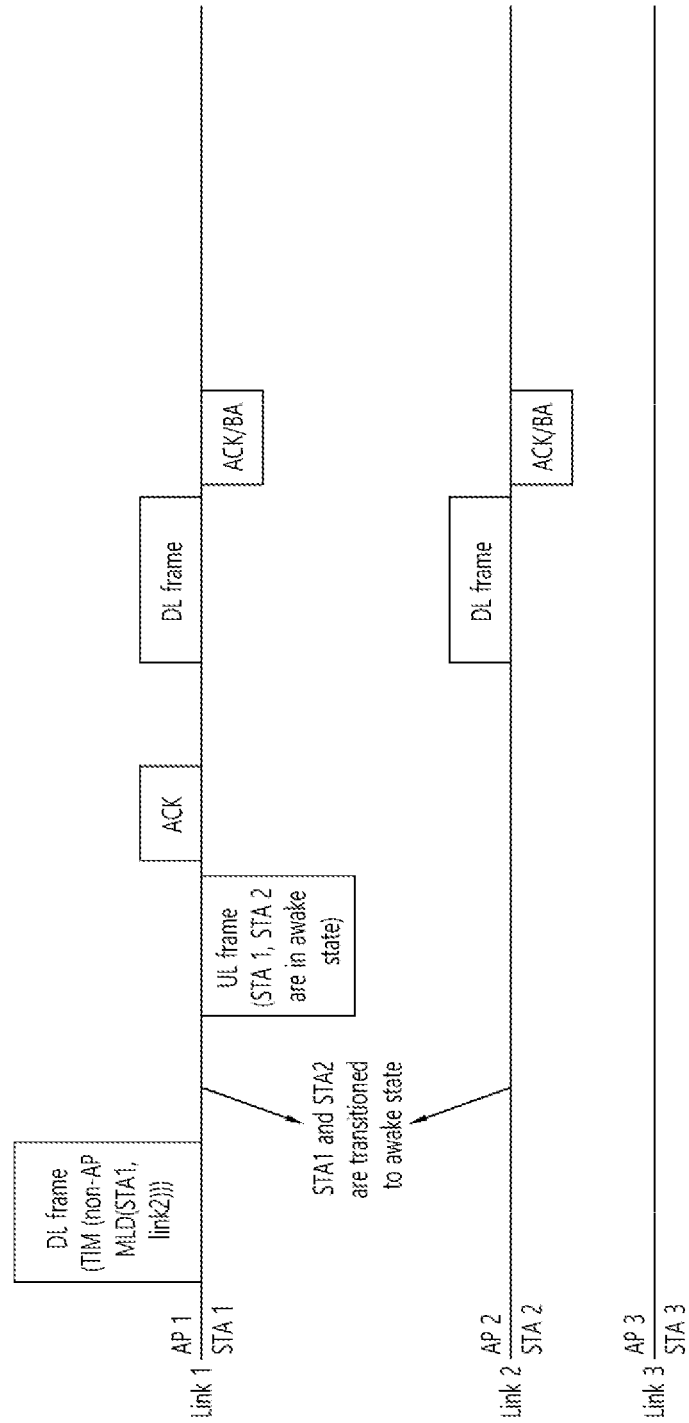
FIG. 32 shows an example in which an AP MLD notifies a non-AP MLD that there is buffered traffic in multi-link operation.

Method 2: When the AP receives traffic for a TID with default TID-to-link mapping (that is, the TID is mapped to all available links), the AP responds to links for one or more of all available links. Traffic indication information is transmitted only to STAs. The non-AP MLD wakes up a corresponding terminal based on the information indicated by the traffic indication information, and transmits a frame including information about the awake STAs to the AP MLD/AP to inform which terminal is awake. FIG. 32 shows an example of this.

FIG. 32 shows an example in which an AP MLD notifies a non-AP MLD that there is buffered traffic in multi-link operation.

Referring to FIG. 32, APs 1, 2, and 3 exist in the AP MLD, and STA1, 2, and 3 in the Non-AP MLD are associated with APs 1, 2, and 3, respectively. Upon receiving traffic corresponding to the TID mapped to STA1, 2, and 3 (i.e., Links 1, 2, and 3), the AP may indicate that only STA1 and STA2 among STAs 1, 2, and 3 have buffered traffic. That is, even if there is buffered traffic corresponding to STAs 1, 2, and 3, the AP (or AP MLD) may transmit a traffic indication to the corresponding STAs in order to awake some of the three STAs.

In FIG. 32, when AP MLD (or AP1) transmits a DL frame to STA1 through link1,along with an indicator indicating that STA1 (or non-AP MLD of STA1) has buffered traffic, the AP MLD transmits information to awake STA2 (i.e., STA2 also has buffered traffic). If non-AP MLD wakes STA1 and STA2 (link2) based on the information received from the AP and transmits a UL frame to the AP (or AP MLD), and if STA1 and STA2 transmit information that they are awake (i.e., information that they are ready to receive DL frames), the AP (or AP MLD) transmits a DL frame to STA1 and STA2 through Link 1 and Link 2.

<How to Transmit by Including Additional Information Such as Latency Traffic in Addition to AP BSR>

As mentioned above, when an AP transmits a beacon including TIM, it may also transmit the amount of buffered traffic (e.g., queue size of the non-AP MLD) for the non-AP MLD. At this time, the AP may also transmit the attribute of buffered traffic, and may transmit one or more of the items listed below together with the amount of buffered traffic included in the attribute.

1) Lower latency traffic/data indication: This is an indicator indicating whether lower latency traffic is included among buffered traffic. For example, if the value is set to 1, the indicator indicates that there is lower latency traffic. The indicator consists of one bit, but may include a TID for lower latency traffic instead of the indicator. If more than one TID can be included, if there is multiple traffic and a TID for one traffic is to be included, the TID for the highest priority (or urgent) traffic is included in the indicator.

2) Time-sensitive traffic/data indication: This is an indicator indicating whether time-sensitive traffic is included among buffered traffic. For example, if the value is set to 1, the indicator indicates that there is time-sensitive traffic. It may be included with the lower latency traffic/data indicator or either. The indicator consists of one bit, but may include a TID for time sensitive traffic instead of the indicator. If more than one TID can be included, the indicator includes the TID for the highest priority (or urgent) traffic when there is multiple traffic and a TID for one traffic is to be included.

3) Traffic ID (TID): The traffic ID of buffered traffic is included as follows.
   A. Option 1: Include Representative Traffic ID
   B. Option 2: Include all traffic IDs. Corresponding TIDs may be consecutively included or a TID bitmap may be included. In the case of a TID bitmap, each bit in the bitmap corresponds to each TID.
   C. Option 3: Include one or more TIDs corresponding to lower latency traffic (or time sensitive traffic)

The non-AP MLD that has obtained the corresponding information (one or more of Lower latency traffic/data indication, Time-sensitive traffic/data indication, Traffic ID (TID)) determines how many non-AP STAs within the MLD to awake based on the corresponding information and wakes them up.

The corresponding information (One or more of Lower latency traffic/data indication, Time-sensitive traffic/data indication, Traffic ID (TID)) may be transmitted together with the amount of buffered traffic for the non-AP MLD defined above (e.g., BSR for the non-AP MLD) or may be transmitted independently.

The corresponding information (One or more of Lower latency traffic/data indication, Time-sensitive traffic/data indication, Traffic ID (TID)) may be included in a Beacon frame in the form of an element and transmitted, or may be included in a DL frame in the form of an A-Control field and transmitted.

Figure 33:
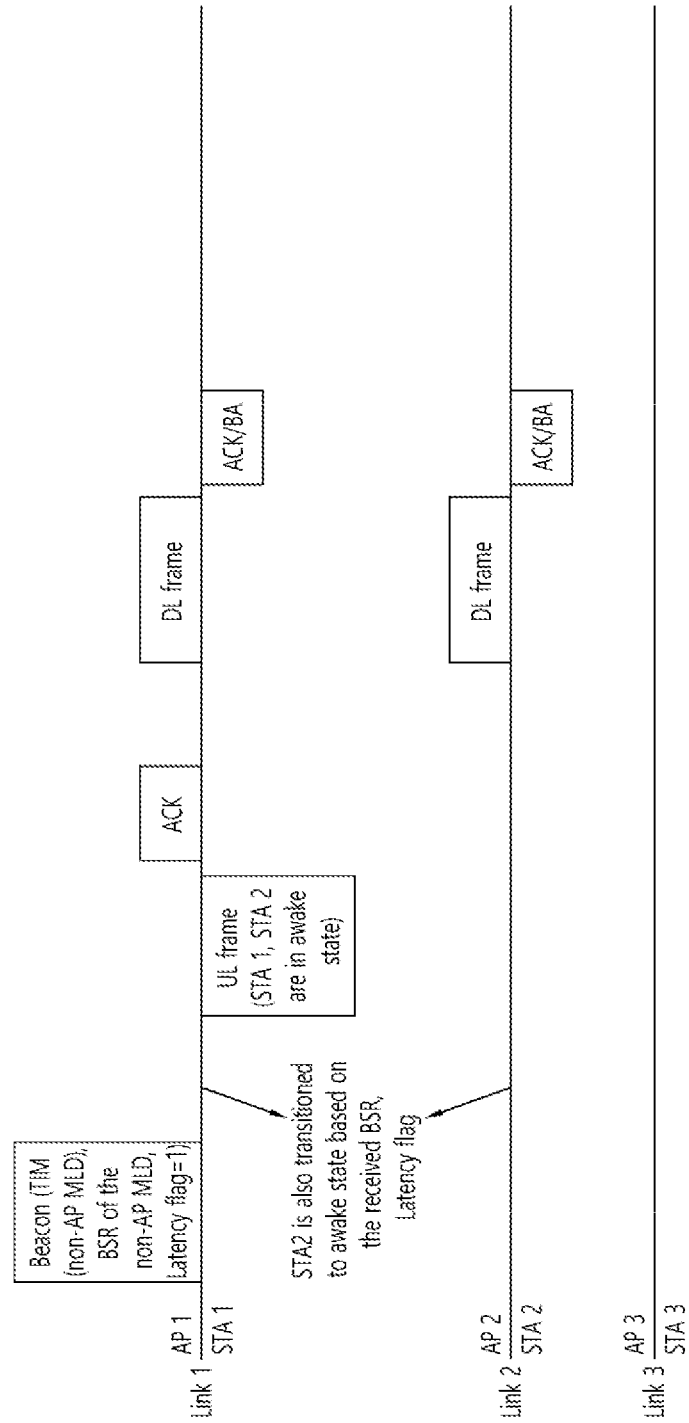
FIG. 33 shows an example in which a lower latency traffic indicator is included and transmitted through a beacon frame.

FIG. 33 shows an example in which a lower latency traffic indicator is included and transmitted through a beacon frame.

Referring to FIG. 33, since the Latency flag is set to 1, it indicates that the AP MLD has lower latency traffic. Therefore, the non-AP MLD wakes up STA1 and STA2 to quickly receive data, and the non-AP MLD transmits a UL frame to the AP MLD to inform that STA1 and STA2 have occurred. In FIG. 33, STA1 informs that STA1 and STA2 are in an awake state through one UL frame, but STA1 and STA2 may each transmit a UL frame (PS-Poll, QoS Null frame) through each link to notify that they are in an awake state.

Figure 34:
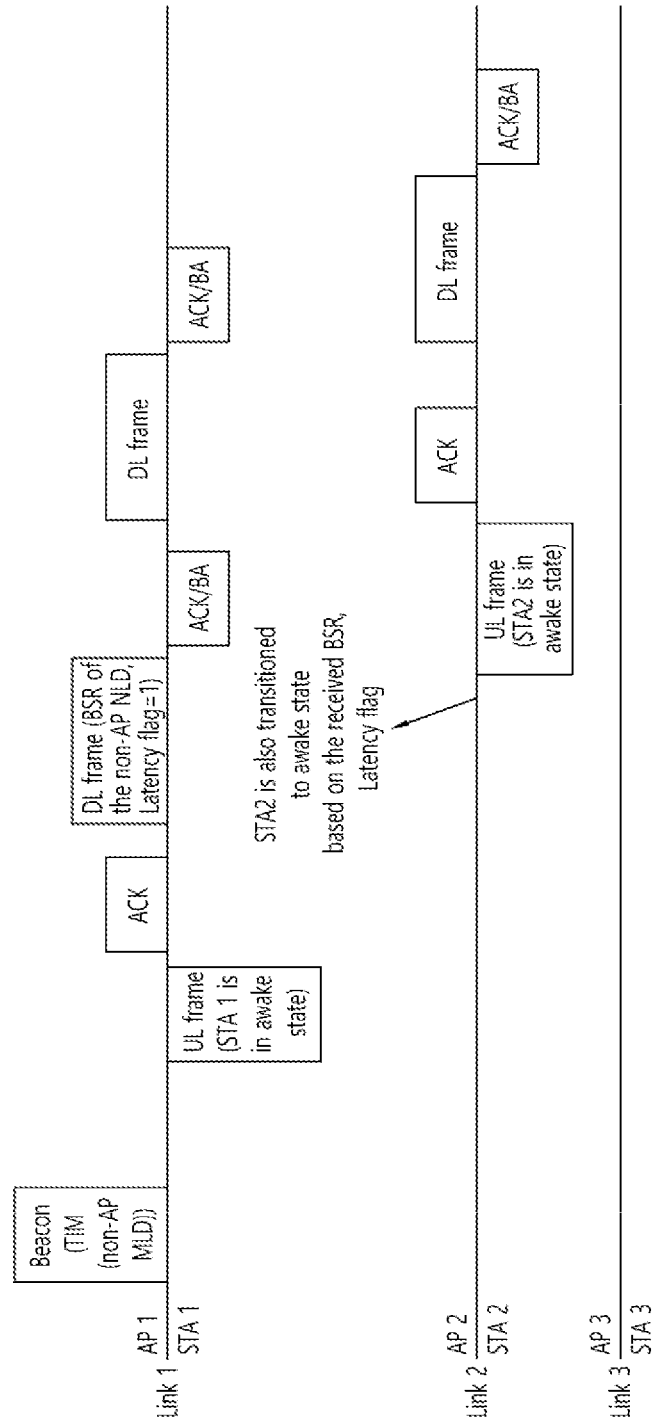
FIG. 34 shows an example of transmission by including a lower latency traffic indicator in a DL frame transmitted to a corresponding non-AP MLD instead of a beacon.

FIG. 34 shows an example of transmission by including a lower latency traffic indicator in a DL frame transmitted to a corresponding non-AP MLD instead of a beacon.

In FIG. 34, TIM information for waking up the Non-AP MLD is included in the Beacon. After STA1 wakes up, it notifies the AP that it has awakened by transmitting a UL frame such as PS-Poll or QoS Null frame through Link1. When the AP receives PS-Poll or QoS Null from the terminal, thereafter, when transmitting a DL frame to a corresponding terminal, information indicating that there is lower latency traffic (Latency flag=1) is included in it and sent together with the BSR for the non-AP MLD. Upon receiving the BSR and Latency flag, the non-AP MLD wakes up STA2, and STA2 transmits a UL frame to the AP to notify that it woke up.

2-2. BSR Information of Non-AP MLD Included in DL Frame

Figure 35:
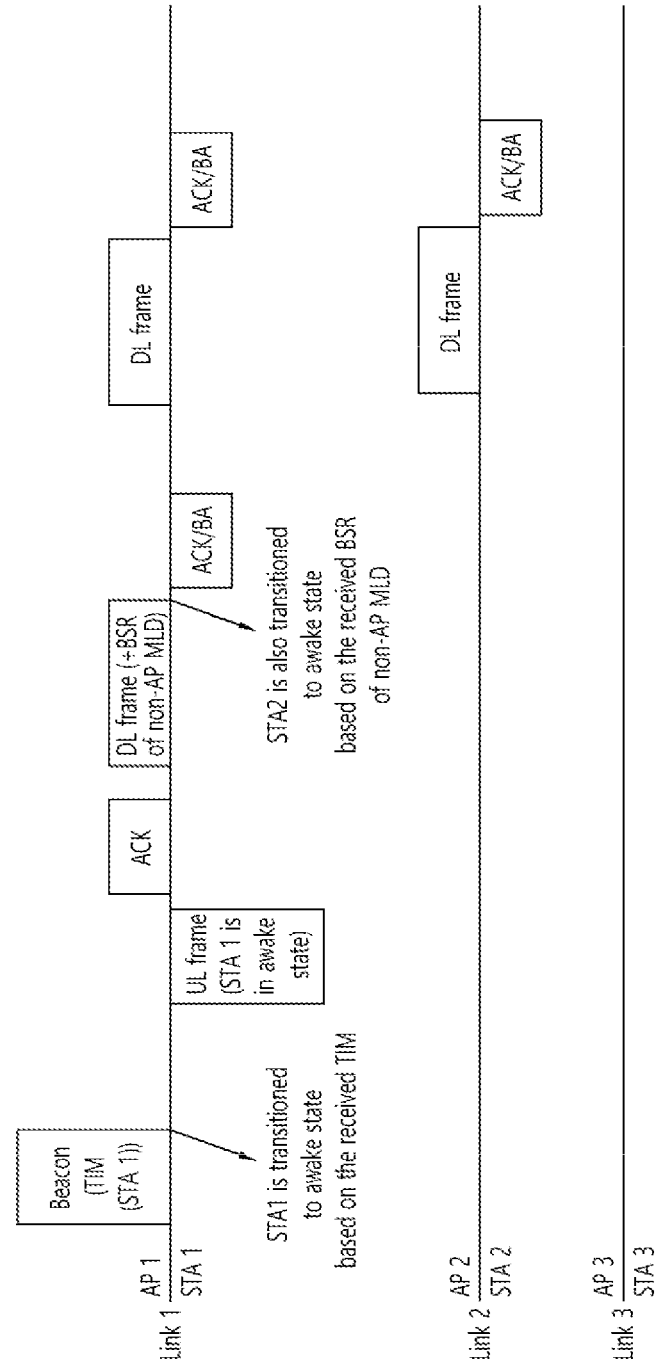
FIG. 35 shows an example in which an AP MLD notifies BSR information for a non-AP MLD through a DL frame in multi-link operation.

FIG. 35 shows an example in which an AP MLD notifies BSR information for a non-AP MLD through a DL frame in multi-link operation.

Detailed delivery method: Detailed delivery method: When an AP MLD (or AP STA) transmits an individually addressed (i.e., unicast) frame to an awake UE, the BSR information for the non-AP MLD (or non-AP STA) defined above is included in the corresponding frame (e.g., DL Data frame) and transmitted. The Non-AP MLD (or non-AP STA) uses the buffer status report information included in the DL frame to determine how many links (or STAs corresponding to the links) among multiple available links to transition to awake, and it notifies the AP by transmitting an uplink frame including information on awake links/STAs to the AP.

In FIG. 35, it is assumed that TID(s) for non-AP MLD are all mapped to available links through default TID-to-link mapping. 35, when AP1 transmits a Beacon through Link1, it may transmit buffered traffic information for another link/another STA, since the TID is mapped to all available links, a beacon frame including a wake-up TIM is transmitted only to the corresponding STA (e.g., STA1). The Non-AP MLD (or STA1) transitions STA1 to the awake state, even if the TIM contains information to wake only STA1, even if the TID is mapped to all links. Thereafter, STA1 may transmit a UL frame (i.e., PS-Poll, or QoS Null) notifying that it has occurred to the AP, and may receive an Ack frame in response thereto. When AP1transmits a DL frame to STA1, buffer status information (e.g., BSR or queue size) for a non-AP MLD corresponding to STA1 is included and transmitted. When STA1 receives the DL frame and receives BSR information about the non-AP MLD, it can determine how many of its available links to awake. (In the embodiments of this specification, only BSR information for non-AP MLD is described, but as mentioned above, a method for including one or more of various types of BSRs (e.g., BSR information for each STA in a non-AP MLD, or BSR information for each AC (or TID) of a non-AP MLD, etc.) may be substituted.) FIG. 35 shows an example of transitioning STA2 for Link2 from doze state to awake state. STA1 shows an example of transmitting ACK/BA to AP1 as a response after receiving the DL frame. Subsequent operations of the non-AP MLD (STA) and the AP (/AP MLD) may perform one or more of the following operations.

1) As shown in FIG. 35, AP1 (or AP MLD) receiving a response frame (ACK/BA) for DL frame transmission including BSR for non-AP MLD may also transmit a DL frame through the Other link (link 2). However, this has the problem of not being able to guarantee that STA2 is awake.

Figure 36:
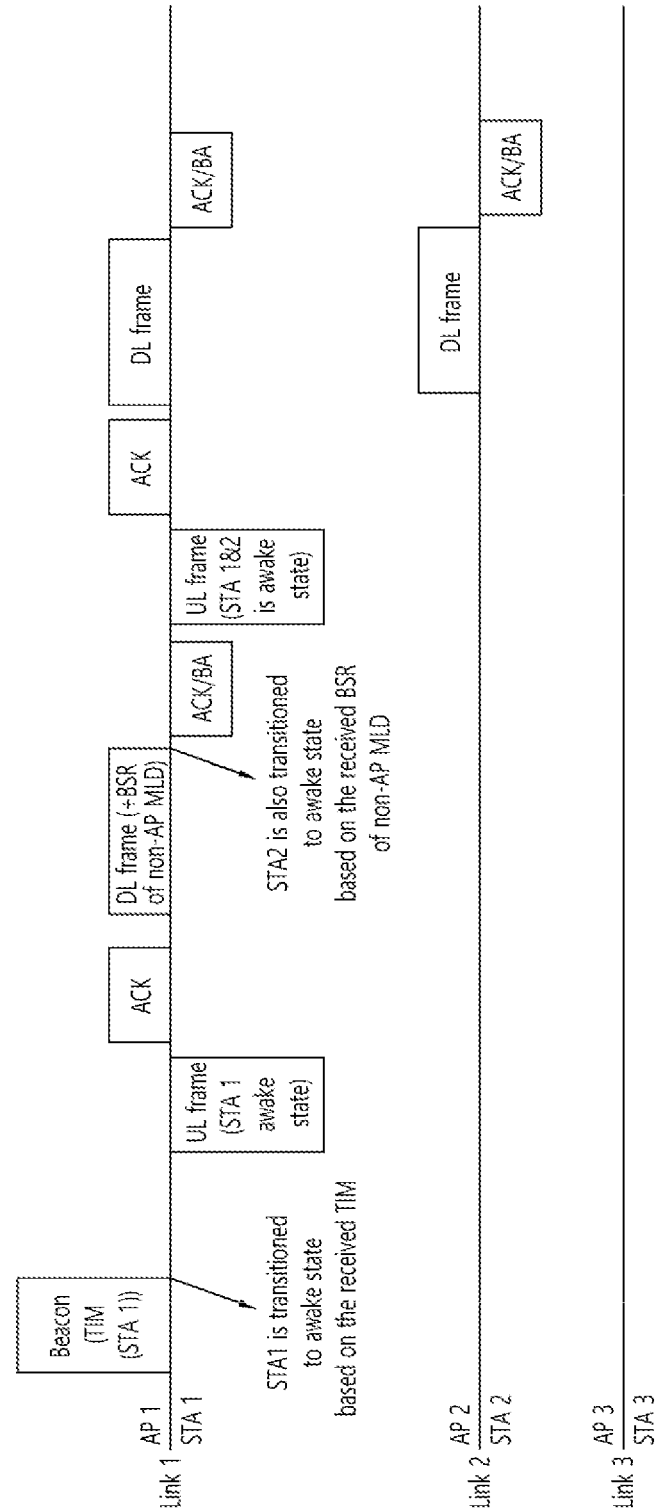
FIG. 36 shows another example in which an AP MLD notifies BSR information for a non-AP MLD through a DL frame in multi-link operation.

2) When the non-AP STA (STA1) receives the BSR for the non-AP MLD from the AP, it determines the links to be awake (or STAs mapped to the links) based on the BSR information, and the information of the awake STA When transmitting the UL frame, it is included and transmitted. The AP may transmit the DL frame through multiple links based on the awake information of the UE included in the UL frame. FIG. 36 shows an example of this.

FIG. 36 shows another example in which an AP MLD notifies BSR information for a non-AP MLD through a DL frame in multi-link operation.

In FIG. 36, STA1 determines to additionally transition STA2 (link2) to the awake state based on the BSR information on the non-AP MLD included in the first DL frame. After STA2 is awake, when STA1 transmits a UL frame to notify that STA2 is awake, information about this is included and transmitted. Thereafter, the AP MLD shows an example of transmitting a DL frame to a non-AP MLD using Link1 and Link2.

Figure 37:
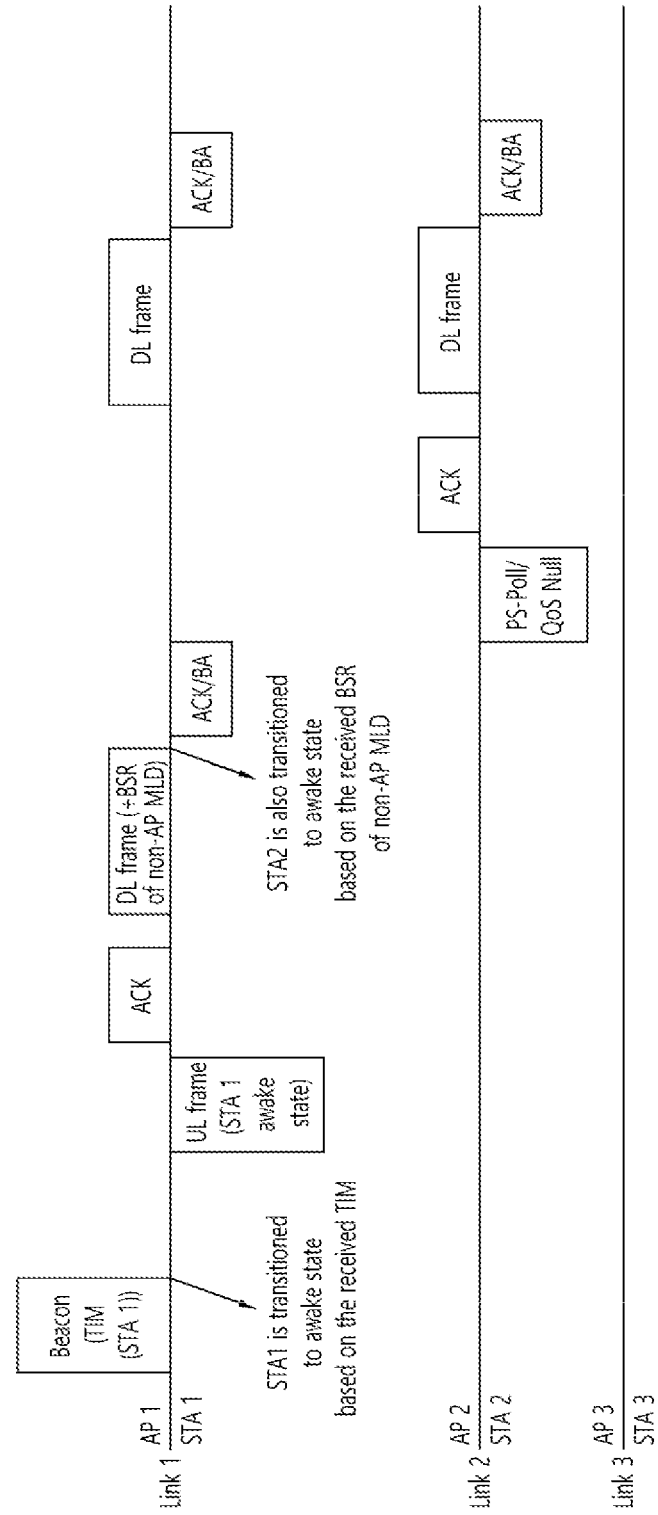
FIG. 37 shows another example in which an AP MLD notifies BSR information about a non-AP MLD through a DL frame in multi-link operation.

Instead of STA1 notifying the AP MLD (or AP1) that 'STA2 has transitioned to the awake state', STA2 may notify that it has transitioned to the awake state through link2. FIG. 37 shows an example of this.

FIG. 37 shows another example in which an AP MLD notifies BSR information about a non-AP MLD through a DL frame in multi-link operation.

In FIG. 37, STA1 (or non-AP MLD) determines to additionally transition STA2 (link2) to the awake state based on the BSR information on the non-AP MLD included in the first DL frame. After STA2 is awake, STA2 transmits a UL frame through link 2 to notify that STA2 has awake. Upon receiving a UL frame (e.g., PS-Poll/QoS Null frame) from STA2 through Link2, the AP MLD knows that STA2 has awake, and transmits a DL frame to the non-AP MLD using Link1 and Link2.

<How to Configure BSR Information of Non-AP MLD>

BSR information of the non-AP MLD included in the DL frame may be configured in the following ways.

FIG. 38 shows an example of the HT Control field.

BSR information of the non-AP MLD is included in the HT Control field and transmitted.

When both B0 and B1 of the HT Control field are set to 1, the HE variant HT Control field becomes, and the remaining bits consist of the A-Control subfield. FIG. 38 shows an example of this.

Figure 39:
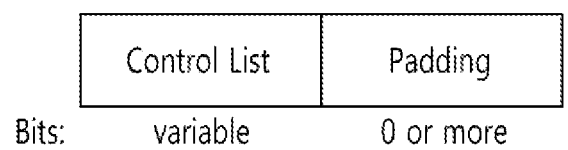
FIG. 39 shows an example of an A-Control subfield.

FIG. 39 shows an example of an A-Control subfield.

The A-Control subfield has a length of 30 bits, and the Control List subfield includes one or more Control subfields.

Figure 40:
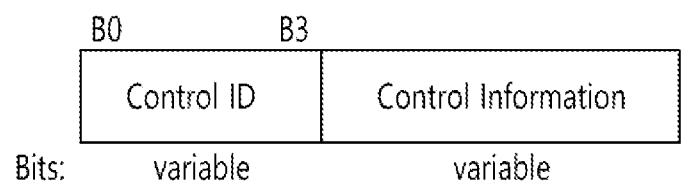
FIG. 40 shows an example of a Control subfield format.

FIG. 40 shows an example of a Control subfield format.

The Control ID subfield indicates the type of information transmitted in the Control Information subfield, and the length of the Control Information subfield is fixed for each value of the Control ID subfield. Depending on the value of Control ID, other Control Information is configured.

As mentioned above, BSR information of Non-AP MLD can be defined as one new Control subfield.

Figure 41:
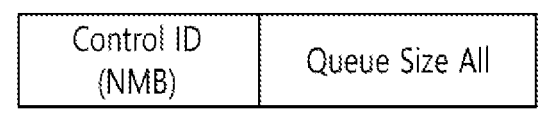

FIG. 41 shows an example of a Non-AP BSR (NMB) Control subfield.

The Control ID of FIG. 41 indicates the Non-AP MLD BSR (NMB), and the queue size of FIG. 41 indicates total queue size information of the Non-AP MLD to which the corresponding STA (the STA indicated by the receiver address) belongs.

FIG. 42 shows an example of a format in which a scaling factor is added in the subfield of FIG. 41.

Queue size information can additionally expand the queue size using a scaling factor as shown in FIG. 42.

The Scaling Factor subfield indicates the unit (SF) in octets of the Queue size subfield.

Queue size is used to indicate the total size of all MSDUs and A-MSDUs buffered by the AP for the non-AP MLD, in conjunction with the SF value of the Scaling Factor subfield. When the value of the Queue size subfield is A and the Scaling Factor subfield is 1, it indicates that the total size of all MSDUs and A-MSDUs buffered by the AP for the non-AP MLD is about A×256 octets, and the non-AP MLD (or STA) can also know this.

The AP-MLD (or AP) may include and transmit one or more of the information listed below, including indicating all buffered information of the Non-AP MLD.

ACI (Access Category Indication) information (e.g., 4 bits size): Information indicating which BSR information corresponds to which AC (Access Category, e.g., AC_VO, AC_VI, AC_BE, AC BK). When included in Bitmap form, each bit is mapped to each AC, indicating that there is traffic for the AC set to 1. The following table shows an example of ACI Bitmap subfield encoding.

TABLE 2

| B0 | B1 | B2 | B3 |
|---|---|---|---|
| AC_BE | AC_BK | AC_VI | AC_VO |

Delta TID (e.g., 2 bits size): Indicates the number of TIDs for the ACI Bitmap subfield and reporting buffer status, and the table below shows an example of Delta TID subfield encoding.

TABLE 3

| Number of bits in the ACI Bitmap subfield that are set to 1 | Mapping of Delta TID subfield value and number of TIDs, $N_{TID}$ |
|---|---|
| 0 | Values 0 to 2 are not applicable; Value 3 indicates 8 TIDs (i.e., all ACs have traffic) |
| 1 | Value 0 indicates 1 TID; Value 1 indicates 2 TIDs; Values 2 to 3 are not applicable; |
| 2 | Value 0 indicates 2 TID; Value 1 indicates 3 TIDs; Value 2 indicates 4 TID; Value 3 is not applicable. |
| 3 | Value 0 indicates 3 TID; Value 1 indicates 4 TIDs; Value 2 indicates 5 TIDs; Value 3 indicates 6 TIDs; |
| 4 | Value 0 indicates 4 TID; Value 1 indicates 5 TIDs; Value 2 indicates 6 TIDs; Value 3 indicates 7 TIDs; |

NOTE 1
The number of TIDs can be obtained as $N_{TID} = N_{ones} + D_{Val}$, where $N_{ones}$ is the number of bits set to one in the AC Bitmap subfield, and $D_{Val}$ is the value of the Delta TID subfield except if $N_{ones}$ is equal to 0 for which there is the $N_{TID} = 8$ case.
NOTE 2
The Delta TID might be used by an AP to determine the setting of the TID Aggregation Limit field in the User Info field addressed to the STA in a subsequent Basic Trigger frame.

ACI High subfield (e.g., 2 bits size): Used together with the Queue Size High subfield, indicates the ACI of AC for the BSR indicated in the Queue Size High subfield, and the table above shows an example of ACI to AC coding.

Queue Size High subfield (e.g., 8 bits size): Indicates the amount of buffered traffic for the AC indicated in the ACI High subfield using the SF unit of the Scaling Factor subfield.

Queue Size All subfield: The amount of buffered traffic for all ACs indicated by the ACI Bitmap subfield, expressed using the SF octets unit of the Scaling Factor subfield.

Additionally, in the Queue Size High and Queue Size All subfields, a value of 254 indicates that the amount of buffered traffic is greater than 254×SF octets, and a value of 255 indicates that the amount of buffered traffic is unspecified or unknown.

FIG. 43 shows an example of the NMB Control Subfield including all of the above information.

As mentioned above, the value indicated by Scaling Factor is applied to both Queue Size High and Queue Size All, the ACI Bitmap and Delta TID values are applied to Queue Size All, and ACI High is applied to Queue Size High.

In the above, as an example, an AP (or AP MLD) defines and uses a new Control subfield to notify the BSR of a specific non-AP MLD. Hereinafter, a method of using the existing BSR Control subfield will be described.

Figure 44:
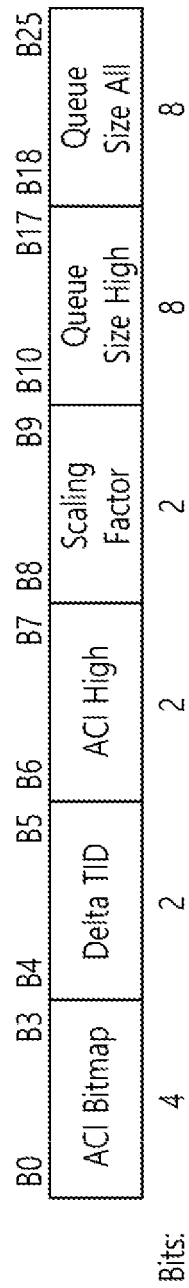
FIG. 44 shows the format of the BSR Control subfield in the 802.11ax system.

FIG. 44 shows the format of the BSR Control subfield in the 802.11ax system.

The BSR Control subfield of FIG. 44 is an HT Control field used when the UE transmits its own buffer status to the AP. In this specification, for simple definition, when an AP MLD transfers the amount of buffered traffic for a specific non-AP MLD among its BSRs to a corresponding non-AP STA, the existing BSR Control subfield is used. However, in order to use this, the BSR transmitted by the AP is not the buffer status for a specific non-AP STA, but rather the corresponding non-AP STA (i.e., the STA indicated by the receiver address of the frame including the BSR Control field). It needs to be redefined to indicate the amount of traffic to be transmitted to the non-AP MLD to which the non-AP STA belongs, and in this case, there must be a restriction that BSR information for a specific non-AP STA cannot be delivered.

That is, when the AP transmits the BSR Control field, information included in the BSR Control field indicates BSR information of the MLD to which the STA indicated by the receiver address of the frame including the BSR Control field belongs.

If the address is set as a broadcast address, the AP displays information about the number of TIDs and AC information related to its entire buffered traffic amount and queue size information for high ACs.

The information defined above may be defined and transmitted in a different form as follows.
1) Amount of buffered traffic for each AC (access category, e.g., AC_VI AC_VO, AC_BE, AC BK) within each non-AP STA: That is, each STA contains queue information corresponding to each AC
2) Amount of buffered traffic for each TID in each non-AP STA: That is, queue information corresponding to each TID is included for each STA
3) The buffered traffic received from STAs in the non-AP MLD is classified by AC and the amount of buffered traffic is notified: That is, the queue size information for each AC of the non-AP MLD is included.
4) The buffered traffic received from STAs in the non-AP MLD is distinguished by TID and the amount of buffered traffic is notified: That is, information on the queue size (amount of buffered traffic) for each TID for the non-AP MLD is included.

It goes without saying that the format defined above can be transmitted in other forms.

For example, by including TID information in addition to the above information, it is possible to indicate which MLD's TID traffic the corresponding BSR information is.

In addition, queue size information for a specific TID of a specific non-AP MLD can be informed to the non-AP MLD by using the QoS Control field instead of the A-Control field. At this time, if the TID has a specific value in the QoS Control field, it indicates that the entire queue size for the corresponding MLD is notified.

<How to Transmit Buffer State for Non-AP MLD Through AP PS Buffer State of QoS Control Field>

As another detailed method, the AP MLD (or AP) may inform the buffer state for the non-AP MLD by using the AP PS Buffer State defined in the QoS Control field. The table below shows the AP PS Buffer State in the QoS Control field.

TABLE 4

| Applicable frame (sub) types | Bits 0-3 | Bit 4 | Bits 5-6 | Bit 7 | Bits 8 | Bit 9 | Bit 10 | Bits 11-15 |
|---|---|---|---|---|---|---|---|---|
| QoS CF-Poll and QoS CF-Ack + CF-Poll frames sent by HC | TID | EOSP | Ack Policy | Reserved | | TXOP Limit | | |
| QoS Data + CF-Poll and QoS Data + CF-Ack + CF-Poll frames sent by HC | TID | EOSP | Ack Policy | A-MSDU Present | | TXOP Limit | | |
| QoS Data and QoS Data + CF-Ack frames sent by HC | TID | EOSP | Ack Policy | A-MSDU Present | | AP PS Buffer State | | |
| QoS Null frames sent by HC | TID | EOSP | Ack Policy | Reserved | | AP PS Buffer State | | |

The AP PS Buffer State subfield is defined as follows.

FIG. 45 shows an example of an AP PS Buffer State subfield.

Referring to FIG. 45, the AP PS Buffer State subfield is an 8-bit field indicating the state of the PS buffer buffered in the AP for the STA. The AP PS Buffer State subfield is divided into three subfields: Buffer State Indicated subfield, Highest-Priority Buffered AC subfield, and AP Buffered Load subfield.

The Buffer State Indicated subfield has a length of 1 bit and is used to indicate the AC of the highest priority traffic buffered in the remaining AP except MSDU or A-MSDU in the current frame.

The AP Buffered Load subfield has a length of 4 bits and is used to indicate the total buffer size (rounded to the nearest multiple of 4096 octets and expressed in units of 4096 octets) of all MSDUs or A-MSDUs (excluding the MSDU or A-MSDU of the current QoS data frame) buffered in the QoS AP. The AP Buffered Load subfield with a value of 15 indicates a buffer size larger than 57344 octets. The AP Buffered Load subfield with a value of 0 is used alone to indicate the absence of buffered traffic for the highest priority buffered AC when the Buffer State Indicated bit is 1.

If the Buffer State Indicated bit is 0, the Highest-Priority Buffered AC subfield and AP Buffered Load subfield are reserved.

FIG. 46 shows an example of an AP PS Buffer State subfield including BSR information for Non-AP MLD.

Referring to FIG. 46, it can be seen that the reserved field of the AP PS Buffer State subfield can be used to indicate the buffer state for the non-AP MLD.

The Non-AP MLD PS Buffer State Indicated subfield is a field indicating whether information on buffered traffic (i.e., what the AP is storing) for a non-AP MLD of a receiver of a QoS frame (non-AP STA) including a QoS Control field is included in the AP PS Buffered State field. When the Non-AP MLD PS Buffer State Indicated subfield is set to 1, Highest Priority Buffered AC indicates the highest priority AC for buffered traffic for a non-AP MLD to which a non-AP STA, which is a receiver of a QoS frame including a QoS Control field, belongs, and QoS AP Buffered Load also indicates the total buffer size for the corresponding Non-AP MLD. That is, through the AP PS Buffer State subfield of FIG. 46, the buffered traffic (all MSDUs and A-MSDUs of the non-AP MLD buffered at the QoS AP) MLD) can be delivered.

The Non-AP MLD PS buffer status is used to indicate whether the AP PS buffer status is for a non-AP MLD of a receiver (i.e., a non-AP STA) of a QoS frame including a QoS Control field.

The Buffered State Indicated subfield is used to indicate whether the AP PS buffer state is specified. The Buffered State Indicated subfield is set to 1 to indicate that the AP PS buffer state is designated.

If Non-AP MLD PS Buffer State Indicated is set to 1, the Highest Priority Buffered AC subfield is used to indicate the AC of the highest priority traffic among traffics for a corresponding non-AP MLD among traffics buffered in the AP MLD except for the MSDU or A-MSDU of the current frame.

The AP Buffered Load subfield is rounded up to the nearest multiple of 4096 octets for all MSDUs and A-MSDUs for the non-AP MLD among all MSDUs and A-MSDUs buffered in the QoS AP, and is used to indicate the total buffer size expressed in units of 4096 octets.

The AP Buffered Load subfield set to 15 indicates that the buffer size is greater than 57,344 octets. The AP Buffered Load subfield set to 0 is used only to indicate no buffered traffic for the highest priority buffered AC indicated when the Buffer State Indicated bit is 1.

When the Buffer State Indicated subfield is 0, the Highest-Priority Buffered AC subfield and the AP Buffered Load subfield are reserved.

Hereinafter, the above-described embodiment will be described with reference to FIGS. 1 to 46.

Figure 47:
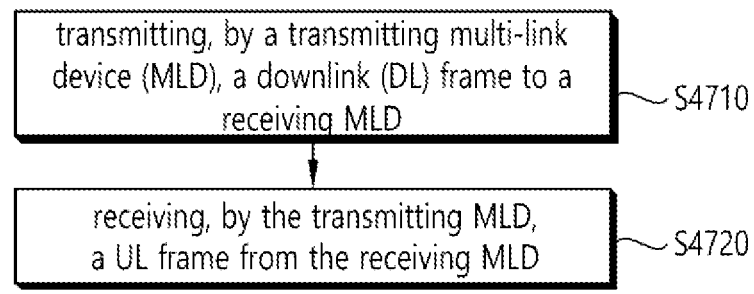
FIG. 47 is a flowchart illustrating a procedure for transmitting BSR information in multi-link operation according to the present embodiment.

FIG. 47 is a flowchart illustrating a procedure for transmitting BSR information in multi-link operation according to the present embodiment.

The example of FIG. 47 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward, compatibility with the 802.11ax system.

The example of FIG. 47 may be performed in the transmitting MLD.

This embodiment proposes a method and apparatus for setting a format of buffer status information transmitted from a transmitting MLD (or AP MLD) to a receiving MLD (or non-AP MLD).

In step S4710, the transmitting multi-link device (MLD) transmits a downlink (DL) frame to a receiving MLD.

In step S4720, the transmitting MLD receives a UL frame from the receiving MLD.

The DL frame includes BSR information for the receiving MLD. The BSR information for the receiving MLD is traffic information for the receiving MLD buffered in the transmitting MLD.

BSR information for the receiving MLD is included in a buffer state subfield of a quality of service (QoS) control field. The buffer state subfield is an AP PS Buffer State subfield and is allocated to Bits 8 to 15 of the QoS Control field. That is, this embodiment proposes a method in which the transmitting MLD informs the buffer status of the receiving MLD by using the AP PS Buffer State subfield.

Specifically, the buffer status subfield may include a reserved field and first to third subfields.

The reserved field may include information on whether the buffer status subfield includes the BSR information for the receiving MLD. The first subfield may include information on whether an access point power saving (AP PS) buffer state is designated.

When the reserved field is set to 1, the BSR information for the receiving MLD may be included in the buffer status subfield. The second subfield may include information on an access category (AC) of traffic having the highest priority for the receiving MLD buffered in the transmitting MLD. The third subfield may include information on a total buffer size of traffic for the receiving MLD buffered in the transmitting MLD.

The total buffer size of the traffic for the receiving MLD may be rounded up to the nearest multiple of 4096 octets and set in units of 4096 octets. When the third subfield is set to 15, it may be determined that the total buffer size of the traffic for the receiving MLD is greater than 57,344 octets. When the first subfield is set to 1 and the third subfield is set to 0, the third subfield may include information that there is no buffered traffic for the AC of the highest priority traffic.

When the first subfield is set to 0, it may be determined that the AP PS buffer state is not designated, and the second and third subfields may be reserved.

As another example, this specification proposes a method for including and transmitting additional information such as low latency traffic in addition to the BSR information for the receiving MLD.

The DL frame may further include a first, second or third information field. The first information field may include information on whether low latency traffic is included in traffic for the receiving MLD buffered in the transmitting MLD. The second information field may include information on whether time sensitive traffic is included in the traffic for the receiving MLD buffered in the transmitting MLD. The third information field may include information on a traffic Identifier (ID) of the traffic for the receiving MLD buffered in the transmitting MLD. For example, when the first information field is set to 1, the low latency traffic may be included in the traffic for the receiving MLD buffered in the transmitting MLD. When the second information field is set to 1, the time sensitive traffic may be included in the traffic for the receiving MLD buffered in the transmitting MLD.

At least one STA included in the receiving MLD transitions to an awake state based on the first, second or third information field. Also, the UL frame may include information indicating that the at least one STA is in the awake state. The UL frame may be a PS poll frame or a QoS null frame. For example, it is assumed that the transmitting MLD includes a first and a second AP, the receiving MLD includes a first and a second STA, the first AP and the first STA operate on a first link, and the second AP and the second STA operate on a second link. Both the first and second STAs may transition to an awake state based on the first information field. In this case, the first STA may notify that the first and second STAs are in an awake state through the UL frame on the first link. Alternatively, the first STA notifies that it is in an awake state through the UL frame on the first link, and the second STA may notify that it is in an awake state through the UL frame on the second link.

As another example, when the DL frame is a beacon frame, the BSR information on the receiving MLD may include a threshold value and a queue size subfield. The queue size subfield may include information on whether the queue size for each receiving MLD (or each receiving STA) exceeds the threshold value.

The threshold value may be obtained through negotiation in advance without being included in the BSR information for the receiving MLD. For example, the transmitting MLD and the receiving MLD may negotiate a threshold for a BSR for the receiving MLD through an (association) request/response frame. Based on the negotiated threshold, the queue size subfield may include information on whether the queue size for each receiving MLD (or each receiving STA) exceeds the threshold. Accordingly, the transmitting MLD may not inform the queue size itself when notifying the buffer status information for the receiving MLD, thereby reducing overhead.

Figure 48:
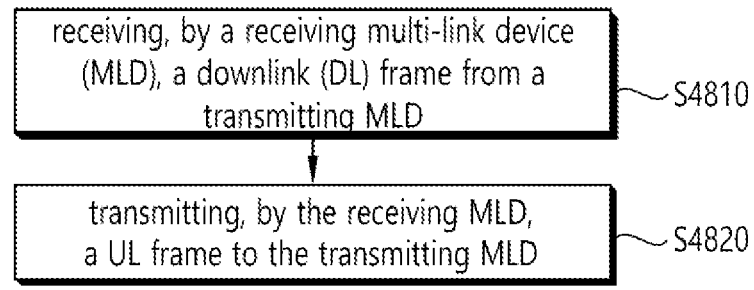
FIG. 48 is a flowchart illustrating a procedure for receiving BSR information in multi-link operation according to the present embodiment.

FIG. 48 is a flowchart illustrating a procedure for receiving BSR information in multi-link operation according to the present embodiment.

The example of FIG. 48 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 48 may be performed in the receiving MLD.

This embodiment proposes a method and apparatus for setting a format of buffer status information transmitted from a transmitting MLD (or AP MLD) to a receiving MLD (or non-AP MLD).

In step S4810, a receiving multi-link device (MLD) receives a downlink (DL) frame from a transmitting MLD.

In step S4820, the receiving MLD transmits a UL frame to the transmitting MLD.

The DL frame includes BSR information for the receiving MLD. The BSR information for the receiving MLD is traffic information for the receiving MLD buffered in the transmitting MLD.

BSR information for the receiving MLD is included in a buffer state subfield of a quality of service (QoS) control field. The buffer state subfield is an AP PS Buffer State subfield and is allocated to Bits 8 to 15 of the QoS Control field. That is, this embodiment proposes a method in which the transmitting MLD informs the buffer status of the receiving MLD by using the AP PS Buffer State subfield.

Specifically, the buffer status subfield may include a reserved field and first to third subfields.

The reserved field may include information on whether the buffer status subfield includes the BSR information for the receiving MLD. The first subfield may include information on whether an access point power saving (AP PS) buffer state is designated.

When the reserved field is set to 1, the BSR information for the receiving MLD may be included in the buffer status subfield. The second subfield may include information on an access category (AC) of traffic having the highest priority for the receiving MLD buffered in the transmitting MLD. The third subfield may include information on a total buffer size of traffic for the receiving MLD buffered in the transmitting MLD.

The total buffer size of the traffic for the receiving MLD may be rounded up to the nearest multiple of 4096 octets and set in units of 4096 octets. When the third subfield is set to 15, it may be determined that the total buffer size of the traffic for the receiving MLD is greater than 57,344 octets. When the first subfield is set to 1 and the third subfield is set to 0, the third subfield may include information that there is no buffered traffic for the AC of the highest priority traffic.

When the first subfield is set to 0, it may be determined that the AP PS buffer state is not designated, and the second and third subfields may be reserved.

As another example, this specification proposes a method for including and transmitting additional information such as low latency traffic in addition to the BSR information for the receiving MLD.

The DL frame may further include a first, second or third information field. The first information field may include information on whether low latency traffic is included in traffic for the receiving MLD buffered in the transmitting MLD. The second information field may include information on whether time sensitive traffic is included in the traffic for the receiving MLD buffered in the transmitting MLD. The third information field may include information on a traffic Identifier (ID) of the traffic for the receiving MLD buffered in the transmitting MLD. For example, when the first information field is set to 1, the low latency traffic may be included in the traffic for the receiving MLD buffered in the transmitting MLD. When the second information field is set to 1, the time sensitive traffic may be included in the traffic for the receiving MLD buffered in the transmitting MLD.

At least one STA included in the receiving MLD transitions to an awake state based on the first, second or third information field. Also, the UL frame may include information indicating that the at least one STA is in the awake state. The UL frame may be a PS poll frame or a QoS null frame. For example, it is assumed that the transmitting MLD includes a first and a second AP, the receiving MLD includes a first and a second STA, the first AP and the first STA operate on a first link, and the second AP and the second STA operate on a second link. Both the first and second STAs may transition to an awake state based on the first information field. In this case, the first STA may notify that the first and second STAs are in an awake state through the UL frame on the first link. Alternatively, the first STA notifies that it is in an awake state through the UL frame on the first link, and the second STA may notify that it is in an awake state through the UL frame on the second link.

As another example, when the DL frame is a beacon frame, the BSR information on the receiving MLD may include a threshold value and a queue size subfield. The queue size subfield may include information on whether the queue size for each receiving MLD (or each receiving STA) exceeds the threshold value.

The threshold value may be obtained through negotiation in advance without being included in the BSR information for the receiving MLD. For example, the transmitting MLD and the receiving MLD may negotiate a threshold for a BSR for the receiving MLD through an (association) request/response frame. Based on the negotiated threshold, the queue size subfield may include information on whether the queue size for each receiving MLD (or each receiving STA) exceeds the threshold. Accordingly, the transmitting MLD may not inform the queue size itself when notifying the buffer status information for the receiving MLD, thereby reducing overhead.

3. Device Configuration

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG.

11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure receives a downlink (DL) frame from a transmitting multi-link device (MLD); and transmits a UL frame to the transmitting MLD.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving a downlink (DL) frame from a transmitting multi-link device (MLD); and transmitting a UL frame to the transmitting MLD. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
receiving, by a first non-access point (non-AP) station (STA) affiliated with a non-AP multi-link device (MLD), a downlink (DL) frame from a first access point (AP) affiliated with an AP MLD, and
transmitting, by the first non-AP STA, an uplink (UL) frame to the first AP,
wherein the DL frame includes a buffer state subfield of a quality of service (QoS) control field,
wherein the buffer state subfield includes first to third subfields,
wherein the first subfield includes information on whether the buffer state subfield includes buffer status information for the non-AP MLD, and
wherein the buffer status information for the non-AP MLD is traffic information for the non-AP MLD buffered in the AP MLD.

2. The method of claim 1, wherein the first non-AP STA and the first AP operate on a first link,
wherein based on the first subfield being set to 1, the buffer status information for the non-AP MLD is included in the buffer state subfield,
wherein the second subfield includes information on an access category (AC) of traffic having the highest priority for the non-AP MLD buffered in the AP MLD, and
wherein the third subfield includes information on a total buffer size of traffic for the non-AP MLD buffered in the AP MLD.

3. The method of claim 2, wherein the total buffer size of the traffic for the non-AP MLD is rounded up to a nearest multiple of 4096 octets and set in units of 4096 octets,
wherein based on the third subfield being set to 15, it is determined that the total buffer size of the traffic for the non-AP MLD is greater than 57,344 octets,
wherein based on the third subfield being set to 0, the third subfield includes information that there is no buffered traffic for the AC of the traffic having the highest priority.

4. The method of claim 1, wherein the DL frame further includes a first, second or third information field,
wherein the first information field includes information on whether low latency traffic is included in traffic for the non-AP MLD buffered in the AP MLD,
wherein the second information field includes information on whether time sensitive traffic is included in the traffic for the non-AP MLD buffered in the AP MLD,
wherein the third information field includes information on a traffic Identifier (ID) of the traffic for the non-AP MLD buffered in the AP MLD,
wherein at least one STA included in the non-AP MLD transitions to an awake state based on the first, second or third information field.

5. The method of claim 4, wherein the UL frame includes information indicating that the at least one STA is in the awake state.

6. A non-access point (non-AP) multi-link device (MLD) in a wireless local area network (WLAN) system, the non-AP MLD comprising:
a memory;
a transceiver; and
a processor being operatively connected to the memory and the transceiver,
wherein the processor is configured to:
receive, by a first non-AP station (STA) affiliated with the non-AP MLD, a downlink (DL) frame from a first access point (AP) affiliated with an AP MLD; and
transmit, by the first non-AP STA, an uplink (UL) frame to the first AP,
wherein the DL frame includes
a buffer state subfield of a quality of service (QoS) control field,
wherein the buffer state subfield includes first to third subfields,
wherein the first subfield includes information on whether the buffer state subfield includes buffer status information for the non-AP MLD, and
wherein the buffer status information for the non-AP MLD is traffic information for the non-AP MLD buffered in the AP MLD.

7. A method in a wireless local area network (WLAN) system, the method comprising:
transmitting, by a first access point (AP) affiliated with an AP multi-link device (MLD), a downlink (DL) frame to a first non-access point (non-AP) station (STA) affiliated with a non-AP MLD; and
receiving, by the first AP, an uplink (UL) frame from the first non-AP STA,
wherein the DL frame includes
a buffer state subfield of a quality of service (QoS) control field,
wherein the buffer state subfield includes first to third subfields,
wherein the first subfield includes information on whether the buffer state subfield includes buffer status information for the non-AP MLD, and
wherein the buffer status information for the non-AP MLD is traffic information for the non-AP MLD buffered in the AP MLD.

8. The method of claim 7, wherein the first non-AP STA and the first AP operate on a first link,
wherein based on the first subfield being set to 1, the buffer status information for the non-AP MLD is included in the buffer state subfield,
wherein the second subfield includes information on an access category (AC) of traffic having the highest priority for the non-AP MLD buffered in the AP MLD, and
wherein the third subfield includes information on a total buffer size of traffic for the non-AP MLD buffered in the AP MLD.

9. The method of claim 8, wherein the total buffer size of the traffic for the non-AP MLD is rounded up to a nearest multiple of 4096 octets and set in units of 4096 octets,
wherein based on the third subfield being set to 15, it is determined that the total buffer size of the traffic for the non-AP MLD is greater than 57,344 octets,
wherein based on the third subfield being set to 0, the third subfield includes information that there is no buffered traffic for the AC of the traffic having the highest priority.

10. The method of claim 7, wherein the DL frame further includes a first, second or third information field,
wherein the first information field includes information on whether low latency traffic is included in traffic for the non-AP MLD buffered in the AP MLD,
wherein the second information field includes information on whether time sensitive traffic is included in the traffic for the non-AP MLD buffered in the AP MLD, wherein the third information field includes information on a traffic Identifier (ID) of the traffic for the non-AP MLD buffered in the AP MLD, wherein at least one STA included in the non-AP MLD transitions to an awake state based on the first, second or third information field.

11. The method of claim 10, wherein the UL frame includes information indicating that the at least one STA is in the awake state.

* * * * *